United States Patent
Dunham

(10) Patent No.: US 11,680,380 B2
(45) Date of Patent: Jun. 20, 2023

(54) CORNER PROTECTOR FOR BOX PADS

(71) Applicant: Sean Dunham, Lakeville, MN (US)

(72) Inventor: Sean Dunham, Lakeville, MN (US)

(*) Notice: Subject to any disclaimer, the term of this patent is extended or adjusted under 35 U.S.C. 154(b) by 0 days.

(21) Appl. No.: 17/507,443

(22) Filed: Oct. 21, 2021

(65) Prior Publication Data

US 2022/0120053 A1    Apr. 21, 2022

Related U.S. Application Data

(60) Provisional application No. 63/094,893, filed on Oct. 21, 2020.

(51) Int. Cl.
| | |
|---|---|
| *E02D 31/00* | (2006.01) |
| *B65D 5/44* | (2006.01) |
| *B65D 81/05* | (2006.01) |
| *A47B 95/04* | (2006.01) |

(52) U.S. Cl.
CPC ............ *E02D 31/00* (2013.01); *A47B 95/043* (2013.01); *B65D 81/054* (2013.01); *B65D 81/056* (2013.01); *F16M 2200/08* (2013.01)

(58) Field of Classification Search
CPC .... E02D 31/00; F16M 2200/08; A47B 95/00; A47B 95/043; B65D 5/44; B65D 81/054
See application file for complete search history.

(56) References Cited

U.S. PATENT DOCUMENTS

| | | | | |
|---|---|---|---|---|
| 3,049,260 | A * | 8/1962 | Stone | B65D 81/056 217/53 |
| 3,150,854 | A * | 9/1964 | Jamieson | A47B 95/043 248/345.1 |
| 3,762,626 | A * | 10/1973 | Dorsey | B65D 81/056 206/326 |
| 4,278,196 | A * | 7/1981 | Ford | A47B 88/906 229/182.1 |
| 4,742,916 | A | 5/1988 | Galea | |

(Continued)

FOREIGN PATENT DOCUMENTS

| | | | |
|---|---|---|---|
| CN | 202346067 U | * | 7/2012 |
| CN | 209225549 | | 8/2019 |

(Continued)

OTHER PUBLICATIONS

"International Search Report and Written Opinion," for PCT Application No. PCT/US2021/056045 dated Feb. 21, 2022 (11 pages).

(Continued)

*Primary Examiner* — Tan Le
(74) *Attorney, Agent, or Firm* — Pauly, DeVries Smith & Deffner LLC

(57) ABSTRACT

A corner cover for protecting a ground-interface surface is disclosed, including a first plate; a second plate, wherein the second plate is positioned substantially perpendicular to the first plate; a central protrusion, wherein the central protrusion is positioned at a joint between the first plate and the second plate, further wherein the central protrusion having a first end and a second end; a pointed blade, wherein the pointed blade is formed at the first end of the joint between the first plate and the second plate; and a lip, wherein the lip is positioned at the second end of the central protrusion.

20 Claims, 29 Drawing Sheets

(56) References Cited

U.S. PATENT DOCUMENTS

| | | | |
|---|---|---|---|
| 4,801,018 A * | 1/1989 | Wilde | A47B 95/043 |
| | | | 206/453 |
| 5,065,972 A * | 11/1991 | Buckshaw | A47B 95/043 |
| | | | 206/586 |
| 6,068,821 A | 5/2000 | Vandegraaf | |
| 7,507,050 B2 | 3/2009 | McCue et al. | |
| 7,507,051 B2 | 3/2009 | McCue et al. | |
| 7,955,022 B2 | 6/2011 | Raymond | |
| 8,413,360 B2 | 4/2013 | Walters | |
| 8,607,488 B2 | 12/2013 | Johnston | |
| 9,580,878 B2 | 2/2017 | Kollbaum et al. | |
| D834,731 S | 11/2018 | McConnell | |
| 2006/0243636 A1 | 11/2006 | Robichaud et al. | |
| 2009/0239005 A1 | 9/2009 | Hawkins et al. | |
| 2010/0186314 A1 | 7/2010 | Walker et al. | |
| 2014/0053441 A1 | 2/2014 | Arons et al. | |
| 2015/0027014 A1 | 1/2015 | Smith et al. | |
| 2017/0175349 A1 | 6/2017 | Davis et al. | |
| 2018/0322817 A1 | 11/2018 | Gibson et al. | |
| 2019/0106260 A1 | 4/2019 | Ayala | |

FOREIGN PATENT DOCUMENTS

| | | |
|---|---|---|
| DE | 4330402 | 2/1995 |
| EP | 0143299 | 6/1985 |
| GB | 2559053 | 7/2018 |
| JP | H09142410 | 6/1997 |
| JP | 2551051 Y2 * | 10/1997 |
| JP | 2551051 | 6/2022 |
| KR | 960022928 | 7/1996 |
| KR | 100490960 | 5/2005 |
| KR | 101055881 | 8/2011 |
| KR | 200456482 | 11/2011 |
| KR | 20140023060 | 2/2014 |
| KR | 101835627 | 3/2018 |
| KR | 20190036801 | 4/2019 |
| WO | 2005108679 | 11/2005 |

OTHER PUBLICATIONS

"Steel Corner Protector for Chain—Galvanized w/Groove," U S Cargo product page available at least as early as Aug. 14, 2020 URL <https://www.uscargocontrol.com/Steel-Corner-Protector-for-Chain-Galvanized-W-Groove?msclkid=aeef1279f8b619bd1f5d4d4f5aae3335&utm_source=bing&utm_medium=cpc&utm_campaign=~USCC%20Shopping%20-%20Flatbed%20Trailer%20Equipment%20-%20Corner%20Protectors&utm_term=1100405540156&utm_content=Steel%20Corner%20Protectors> (4 pages).

* cited by examiner

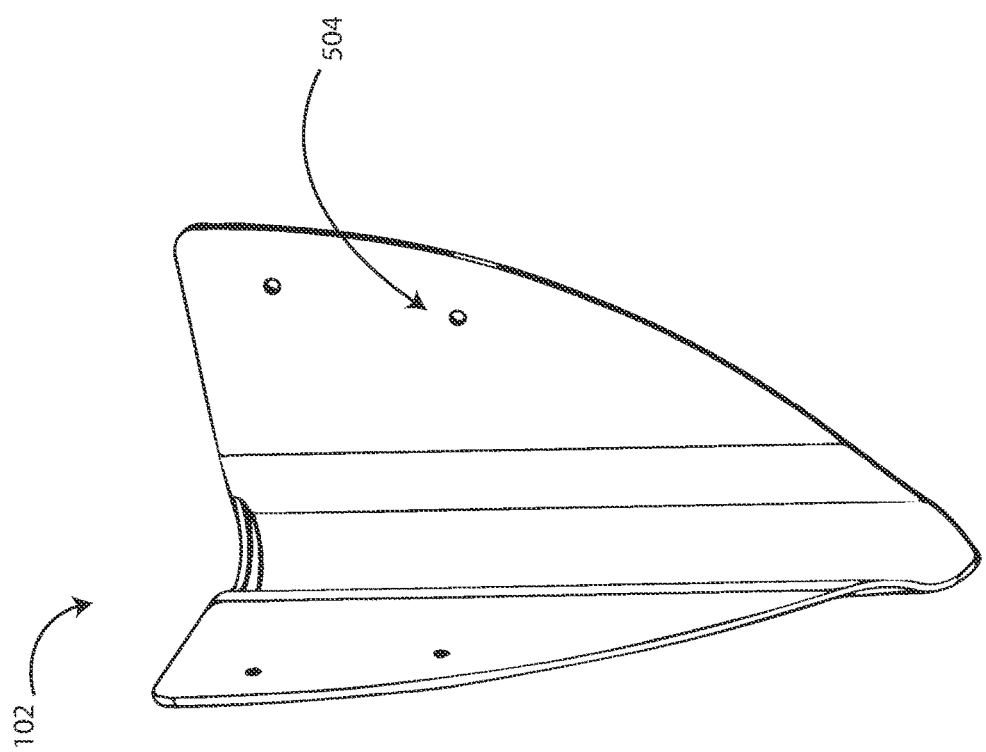

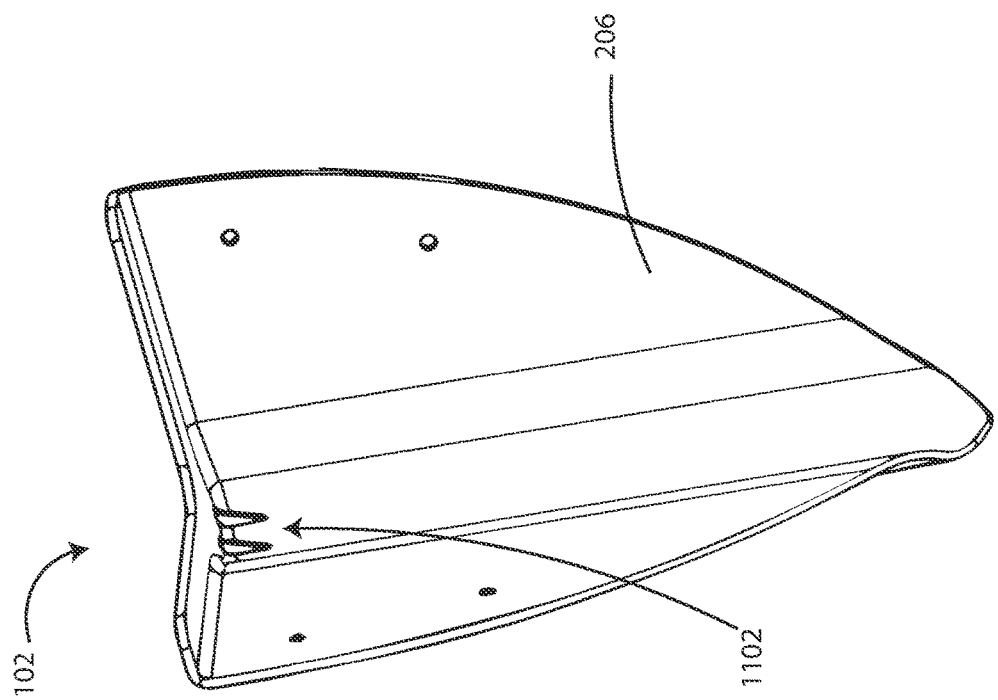

CORNER PROTECTOR FOR BOX PADS

This application claims the benefit of U.S. Provisional Application No. 63/094,893, filed Oct. 21, 2020, the content of which is herein incorporated by reference in its entirety.

FIELD

Embodiments herein relate to corner protectors and, more specifically, to corner protectors for box pads.

BACKGROUND

Electrical and communication boxes provide homes and businesses with basic utilities such as electricity and internet while also providing an easy access point for utility and communication workers to make repairs as needed. Often, these electrical and communication boxes will sit on a fiberglass box pad partially buried in the ground. The fiberglass box pad provides a durable foundation and stabilizes the electrical and communication boxes. However, because part of the fiberglass box pad remains above ground, the corners are vulnerable to damage. Often, the corners of the fiberglass box pad are damaged by mowers, tractors, weed trimmers, shovels, and the like.

Any structural breaks in the fiberglass box pad can inhibit the performance, reliability, and safety of the electrical and communication boxes. This is because once a structural break occurs, animals, unqualified persons, children, dust, water, and dirt can all access the equipment stored in the electrical and communication boxes.

Presently, when a fiberglass box pad is damaged, utility and communication workers must dig up the ground around the fiberglass box pad to fully expose the damaged portion and then a glue-like fiber patch is affixed to the fiberglass box pad to repair the damaged portion. This method of maintenance of fiberglass box pads is reactionary in nature and increases the costs associated with electrical and communication boxes.

SUMMARY

The present disclosure relates to protective covers for electrical and communication boxes. The protective covers can be used to prevent damage to the corner of the boxes, as well as to repair existing boxes that have developed holes.

Corner protectors allow for the corners of the fiberglass box pad to be protected from damage that can occur during yard work. Embodiments herein, can include corner protectors for fiberglass box pads. The corner protectors can act as a preventative measure that can be installed during or after the installation of fiberglass box pads in the ground. The corner protectors can prevent mowers, tractors, weed trimmers, shovels, and the like from directly contacting the fiberglass box pad thereby decreasing the risk of damage to the fiberglass box pad. Because the corner protector is a preventative measure, it can be cheaper to maintain the fiberglass box pads and it can be faster to install the corner protectors than repairing any damage that occurs to the fiberglass box pads. Additionally, the corner protectors can extend the life of the fiberglass box pad by preventing any structural breaks in the fiberglass box pad.

In an embodiment, a corner cover for protecting a ground-interface surface, the corner cover is included having a first plate, a second plate, wherein the second plate is positioned substantially perpendicular to the first plate, a central protrusion, wherein the central protrusion is positioned at a joint between the first plate and the second plate, further wherein the central protrusion having a first end and a second end, a pointed blade, wherein the pointed blade is formed at the first end of the joint between the first plate and the second plate, and a lip, wherein the lip is positioned at the second end of the central protrusion.

In an embodiment, the first plate and the second plate each have a secondary hollow protrusion positioned distal the central protrusion.

In an embodiment, the first plate and the second plate have one or more holes for fasteners.

In an embodiment, the first plate and the second plate include a curved edge, wherein the curved edge merges with the pointed blade.

In an embodiment, the first end of the central protrusion merges with the pointed blade.

In an embodiment, the central protrusion has a hemiconical shape.

In an embodiment, the second end of the central protrusion is adjacent the lip.

In an embodiment, the second end of the central protrusion includes a substantially flat surface.

In an embodiment, the central protrusion includes a hollow interior portion.

In an embodiment, the hollow interior portion includes one or more reinforcement portions positioned at the second end of the central protrusion.

In an embodiment, the lip extends over an edge of an electrical box pad.

In an embodiment, the lip abuts an edge of an electrical box pad.

In an embodiment, further can include one or more anti-heave portions.

In an embodiment, the one or more anti-heave portions are positioned on the pointed blade.

In an embodiment, the one or more anti-heave portions protrude outward from the pointed blade.

In an embodiment, the one or more anti-heave portions are hollow.

In an embodiment, the one or more anti-heave portions include a polygonal structure that extends from the pointed blade at an angle.

In an embodiment, further can include one or more glue channels.

In an embodiment, the one or more glue channels are positioned on the first plate and the second plate.

In an embodiment, the one or more glue channels include a glue injection hole.

In an embodiment, the corner cover includes a unibody structure.

In an embodiment, the corner cover is formed from high-density polyethylene.

In an embodiment, the first plate and the second plate each has a length of 12 inches to 18 inches.

In an embodiment, a corner cover for protecting a ground-interface surface, the corner cover is included having a first plate, a second plate, wherein the second plate is positioned substantially perpendicular to the first plate, a central protrusion, wherein the central protrusion is positioned at a joint between the first plate and the second plate, further wherein the central protrusion having a first end and a second end, and a pointed blade, wherein the pointed blade is formed at the first end of the joint between the first plate and the second plate.

In an embodiment, the first plate and the second plate each have a secondary hollow protrusion positioned distal the central protrusion.

In an embodiment, the first plate and the second plate have one or more holes for fasteners.

In an embodiment, the first plate and the second plate include a curved edge, wherein the curved edge merges with the pointed blade.

In an embodiment, the first end of the central protrusion merges with the pointed blade.

In an embodiment, the central protrusion has a hemiconical shape.

In an embodiment, the second end of the central protrusion includes a substantially flat surface.

In an embodiment, the central protrusion includes a hollow interior portion.

In an embodiment, further can include one or more anti-heave portions.

In an embodiment, the one or more anti-heave portions are positioned on the pointed blade.

In an embodiment, the one or more anti-heave portions protrude outward from the pointed blade.

In an embodiment, the one or more anti-heave portions are hollow.

In an embodiment, the one or more anti-heave portions include a polygonal structure that extends from the pointed blade at an angle.

In an embodiment, further can include one or more glue channels.

In an embodiment, the one or more glue channels are positioned on the first plate and the second plate.

In an embodiment, the one or more glue channels include a glue injection hole.

In an embodiment, the corner cover includes a unibody structure.

In an embodiment, the corner cover is formed from high-density polyethylene.

In an embodiment, the first plate and the second plate each has a length of 12 inches to 18 inches.

In an embodiment, further can include one or more reinforcement portions.

In an embodiment, the one or more reinforcement portions are positioned below the second end of the central protrusion.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 18 is a schematic rear view of the alternative corner protector shown in FIG. 16.

FIG. 21 is a schematic rear view of the alternative corner protector shown in FIG. 19.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Electrical and communication boxes rest on fiberglass box pads to stabilize the boxes and provide a durable foundation. The fiberglass box pads will often be partially buried in the ground, however, the part of the fiberglass box pad that remains above ground is vulnerable to damage. Specifically, the corners of the fiberglass box pad are vulnerable to damage. Often, the corners of the fiberglass box pad are damaged by mowers, tractors, weed trimmers, shovels, and the like.

Corner protectors allow for the corners of the fiberglass box pad to be protected from damage that can occur during yard work. Embodiments herein, can include corner protectors for fiberglass box pads. The corner protectors can act as a preventative measure that can be installed during or after the installation of fiberglass box pads in the ground. The corner protectors can prevent mowers, tractors, weed trimmers, shovels, and the like from directly contacting the fiberglass box pad thereby decreasing the risk of damage to the fiberglass box pad. Because the corner protector is a preventative measure, it can be cheaper to maintain the fiberglass box pads and it can be faster to install the corner protectors than repairing any damage that occurs to the fiberglass box pads. Additionally, the corner protectors can extend the life of the fiberglass box pad by preventing any structural breaks in the fiberglass box pad.

Figure 1:
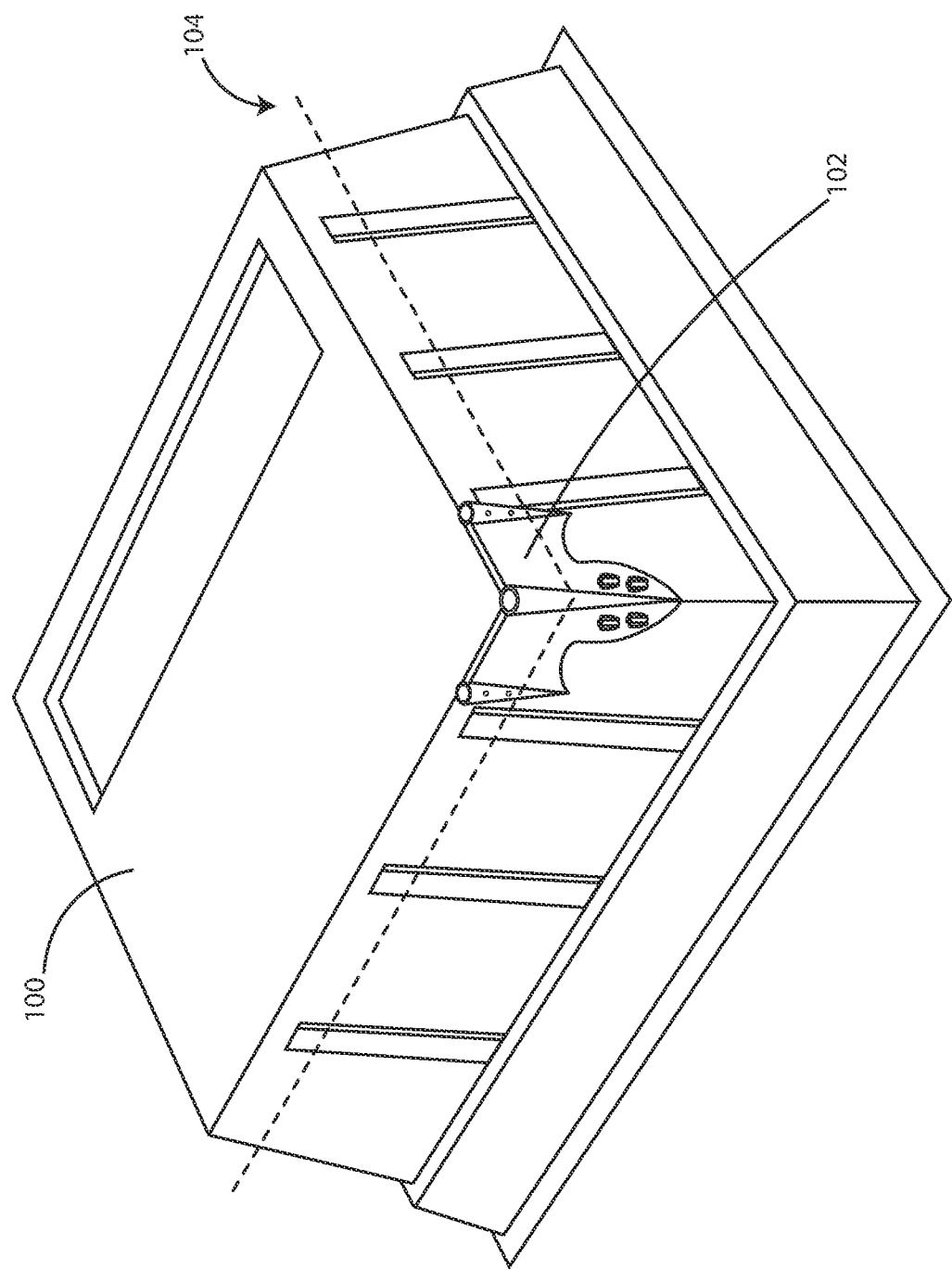
FIG. 1 is a schematic view of a corner protector installed on a fiberglass box pad in accordance with various embodiments herein.

Referring now to FIG. 1 a corner protector installed on a fiberglass box pad is shown in accordance with various embodiments herein. The fiberglass box pad 100 can include at least one corner protector 102 installed on the fiberglass box pad 100. In some embodiments, the corner protector 102 is installed on a corner of the fiberglass box pad 100 to protect the corner from damage. Various materials can be used to form the corner protector 102. However, in some embodiments, the corner protector 102 can be formed of a material such as a metal, ceramic, a polymer, or a composite. For example, in some embodiments, the corner protector 102 can be formed of high-density polyethylene (HDPE), ultra-high molecular weight polyethylene (UHMW-PE), acrylic, polycarbonate, galvanized steel, stainless steel, brass, copper, or the like. In some embodiments, the corner protector 102 can be formed from one material. In other embodiments, the corner protector 102 can be formed from more than one material.

In some embodiments, the fiberglass box pad 100 can be placed partially below a surface 104, for example, dirt, grass, or concrete. In some embodiments, the corner protector 102 can be installed on the fiberglass box pad 100 before the fiberglass box pad 100 is placed partially below the surface 104. In other embodiments, the corner protector 102 can be installed on the fiberglass box pad 100 after the fiberglass box pad 100 is placed partially below the surface 104.

It will be appreciated that the corner protector 102 can be installed on the fiberglass box pad 100 using a variety of methods. Any conventional methods of installation can be used. For example, the corner protector 102 can be installed using an adhesive, a contact cement, or fasteners. For example, in some embodiments, the corner protector 102 can be installed using screws, nails, Velcro®, staplers, rivets, or the like. Additionally, it will be appreciated that in some embodiments the corner protector 102 can be installed on the fiberglass box pad 100 such that the corner protector 102 is above the surface 104. In other embodiments, the corner protector 102 can be installed on the fiberglass box pad 100 such that the corner protector 102 is partially below the surface 104.

The corner protector 102 can take on various dimensions. In some embodiments herein it can be approximately 6 to 18 inches in length, 6 to 15 inches wide, and 0.15 to 0.75 inches thick. However, in some embodiments, the corner protector 102 can be about 4, 5, 6, 7, 8, 9, 10, 11, 12, 13, 14, 15, 16, 17, 18, 19, or 20 inches in length. In embodiments the length can be in range wherein any of the foregoing lengths can serve as the upper or lower bound of the range, provided that the upper bound is greater than the lower bound. In some embodiments, the corner protector 102 can be about 4, 5, 6, 7, 8, 9, 10, 11, 12, 13, 14, 15, 16, or 17 inches in width. In embodiments the width can be in range wherein any of the foregoing widths can serve as the upper or lower bound of the range, provided that the upper bound is greater than the lower bound. In some embodiments, the corner protector 102 can be about 0.05, 0.15, 0.25, 0.35, 0.45, 0.55, 0.65, 0.75, or 0.85 inches thick. In embodiments the thickness can be in range wherein any of the foregoing thickness can serve as the upper or lower bound of the range, provided that the upper bound is greater than the lower bound.

Figure 2:
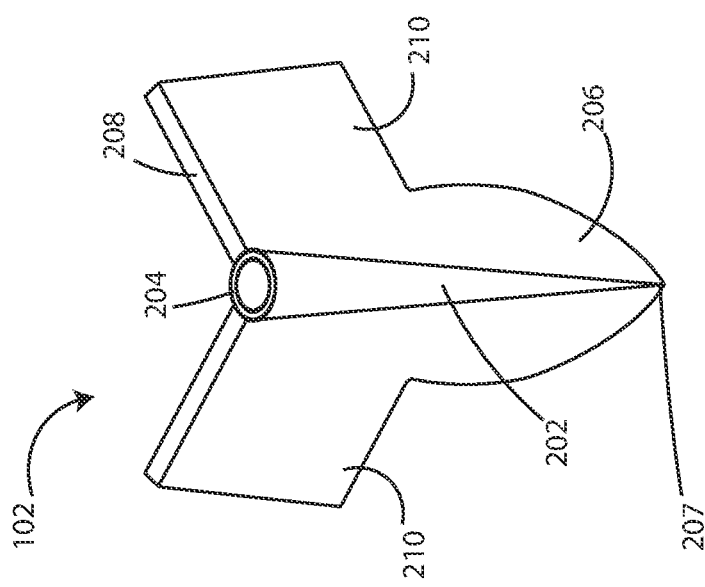
FIG. 2 is a schematic view of a corner protector in accordance with various embodiments herein.

The corner protector 102 can be include various features. Referring now to FIG. 2, a corner protector 102 is shown in accordance with various embodiments herein. Corner protector 102 can include a central protrusion 202, a pointed blade 206, a lip 208, and one or more plates 210. In some embodiments, the central protrusion 202, the pointed blade 206, the lip 208, and the plates 210 can form a unibody structure. In other embodiments, one or more of following, the central protrusion 202, the pointed blade 206, the lip 208, and the plates 210 can be distinct structures adhered to the corner protector 102.

In some embodiments, the central protrusion 202 can include a flat surface 204. The flat surface 204 can be substantially flat to allow for the corner protector 102 to be pressed or hammered into the surface (not shown in this view). In some embodiments, the central protrusion 202 can be hemiconical in shape. In other embodiments, the central protrusion 202 can be rectangular, conical, columnar, pyramidal, polygonal, or the like. In some embodiments, the central protrusion 202 can be positioned in between the plates 210 such that the central protrusion 202 bisects the plates 210. In some embodiments, the central protrusion 202 can be hollow. It will be appreciated that the central protrusion 202 can be filled with air, dirt, a cement, or a polymer material. It will further be appreciated that the central protrusion 202 can absorb the force of an impact by an object and distribute the energy from the object to prevent damage to the fiberglass box pad (not shown in this view).

In various embodiments, an end of the central protrusion 202 can blend and/or integrate with the pointed blade 206. The pointed blade 206 can extend outward from the central protrusion 202. In some embodiments, the pointed blade 206 can have curved edges. In other embodiments, the pointed blade 206 can have straight edges. As shown, the edges of the pointed blade 206 curve into the central protrusion 202 and meet at a point 207. The point 207 of the pointed blade 206 can be sharp in nature such that the pointed blade 206 can pierce the surface. In some embodiments, the pointed blade 206 can have varying thickness. For example, one end of the pointed blade 206 can be thicker than another end. In some embodiments, the point 207 of the pointed blade 206 can be thinner than the rest of the pointed blade 206. In other embodiments, the pointed blade 206 can have a uniform thickness.

In some embodiments, the pointed blade 206 can blend and/or integrate with the plates 210. As shown, the corner protector 102 can include two plates 210. In some embodiments, the plates 210 can have equal lengths. In other embodiments, the plates 210 can have varying lengths. It will be appreciated that increasing the length of the plates 210 can serve to distribute the weight of the corner protector 102 such that any direct impact the corner protector 102 receives can be more spread out and better protect the fiberglass box pad. It will further be appreciated that increasing the length of the plates 210 can serve to increase the surface area of the corner protector 102 thereby covering and protecting a larger area of the fiberglass box pad. As shown, the two plates 210 can have substantially straight edges.

In some embodiments, the plates 210 can be positioned above and/or meet the surface 104 when installed on the fiberglass box pad. In other embodiments, the plates 210 can be positioned such that a portion of the two plates 210 are below the surface when installed on the fiberglass box pad. In some embodiments, the plates 210 can have varying thickness. For example, an end of the plates 210 distal the lip 208 can be thinner than another end proximal the lip 208. In other embodiments, the end of the plates 210 distal the lip 208 can be thicker than the end of the plates 210 proximal the lip 208. In other embodiments, the plates 210 can have a uniform thickness. It will be appreciated that increasing the thickness of the plates 210 can increase the durability and protective properties of the corner protector 102.

The lip 208 of the corner protector 102 can be positioned adjacent the plates 210. In some embodiments, the flat surface 204 of the central protrusion 202 can bisect the lip 208. In some embodiments, the lip 208 can be positioned over a top edge of the fiberglass box pad. In other embodiments, the lip 208 can be positioned such that it abuts the top edge of the fiberglass box pad (described in more detail below). In some embodiments, the lip 208 can extend outward perpendicular the plates 210 thereby creating a lip 208 with a width that is greater than the thickness of the plates 210. In other embodiments, the lip 208 can have a width that is equal to the thickness of the plates 210.

Figure 3:
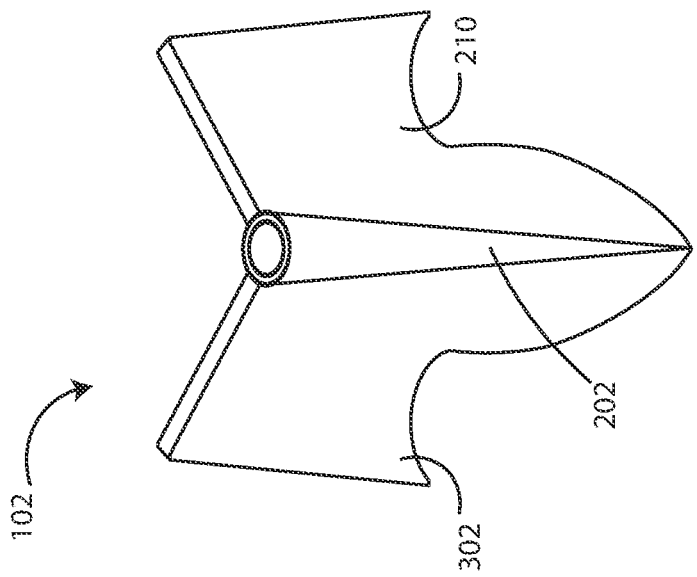
FIG. 3 is a schematic view of an alternative corner protector in accordance with various embodiments herein.

In an alternative embodiment, the plates 210 can have a varying shape. Referring now to FIG. 3, an alternative corner protector 102 is shown in accordance with various embodiments herein. The corner protector 102 can include plates 210. The plates 210 can include a tapered edge 302. As shown, in some embodiments, each plate 210 can include one tapered edge 302. In other embodiments, a plurality of tapered edges 302 can be positioned on each plate 210. In some embodiments, the tapered edge 302 can be positioned on an end on the plates 210 distal the central protrusion 202. In other embodiments, the tapered edge can be positioned at any point along the length of the plates 210. As shown, the plates 210 can include a curved side that blends and/or integrates the tapered edge 302 into the plates 210. In some embodiments, the tapered edge 302 can be thinner than the plates 210. In other embodiments, the tapered edge 302 can have the same thickness as the plates 210. It will be appreciated that the tapered edge 302 can be sharp in nature such that the tapered edge 302 can pierce the surface (not shown in this view).

In another embodiment, the plates 210 can include one or more side protrusions. Referring now to FIG. 3, an alternative corner protector 102 is shown in accordance with various embodiments herein. The corner protector 102 can include one or more plates 210. The plates 210 can include a tapered edge 302 and a side protrusion 402. In some embodiments, the plates 210 can include a side protrusion 402 positioned distal the central protrusion 202. In some embodiments, the side protrusion 402 can include a flat top 404. The flat top 404 can be substantially flat to allow for the corner protector 102 to be pressed or hammered into the surface (not shown in this view). As shown, the side protrusion 402 can blend and/or integrate into the tapered edge 302. In some embodiments, the side protrusion 402 can be hemiconical in shape. In other embodiments, the side protrusion 402 can be rectangular, conical, columnar, pyramidal, polygonal, or the like. In some embodiments, the side protrusion 402 can be hollow. It will be appreciated that the side protrusion 402 can be filled with air, dirt, a cement, or a polymer material. It will further be appreciated that the side protrusion 402 can absorb the force of an impact by an object and distribute the energy from the object to prevent damage to the fiberglass box pad (not shown in this view).

Figure 5:
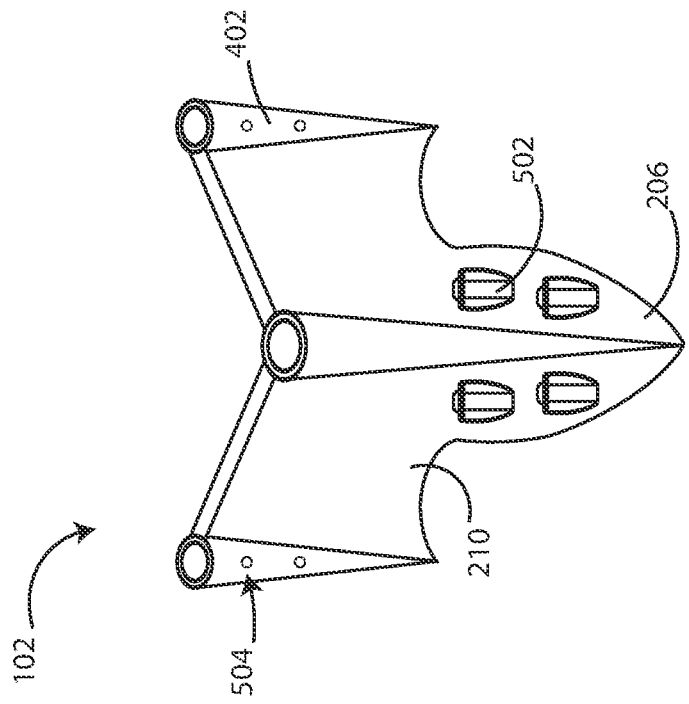
FIG. 5 is a schematic view of an alternative corner protector in accordance with various embodiments herein.
Figure 4:
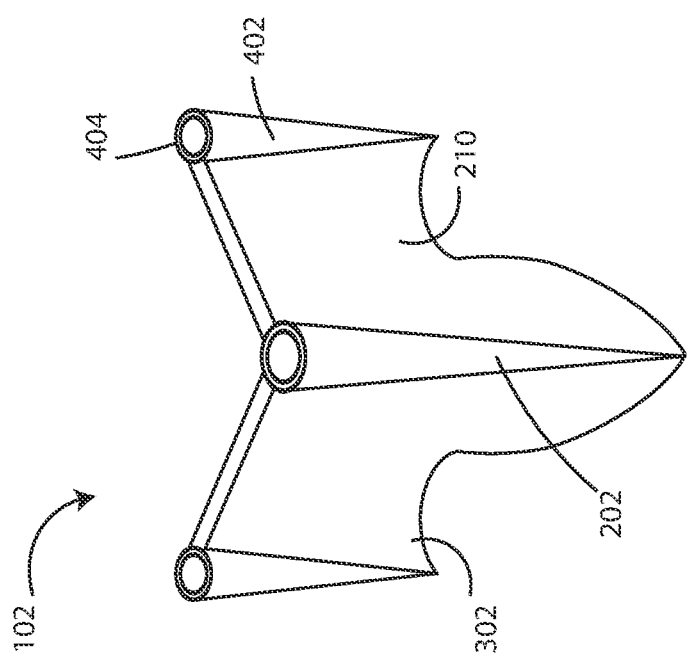
FIG. 4 is a schematic view of an alternative corner protector in accordance with various embodiments herein.

The corner protector 102 can include additional features. Referring to FIG. 5, a corner protector is shown in accordance with various embodiments herein. The corner protector 102 can include one or more anti-heave portions 502 and one or more holes 504. In some embodiments, the holes 504 can be positioned on the side protrusions 402. In other embodiments, the holes 504 can be positioned anywhere along the length of the corner protector 102, for example, the plates 210. In some embodiments, the holes 504 can be used as holes for fasteners to secure the corner protector 102 to the fiberglass box pad (not shown in this view). A variety of fasteners can be used, for example screws, nails, rivets, and the like. It will be appreciated that the corner protector 102 can include a varying number of holes 504. For example, 1, 2, 3, 4, 5, or 6 holes 504 can be included. In embodiments the number of holes 504 can be in range wherein any of the foregoing number of holes 504 can serve as the upper or lower bound of the range, provided that the upper bound is greater than the lower bound.

In some embodiments, the one or more anti-heave portions 502 can be positioned on the pointed blade 206 on the corner protector 102. In some embodiments, the anti-heave portions 502 can protrude outward from the pointed blade 206. The anti-heave portions 502 can be a variety of shapes. In some embodiments, the anti-heave portions 502 can be polygonal in shape. In other embodiments, the anti-heave portions 502 can be rectangular, conical, columnar, pyramidal, or the like. In some embodiments, the anti-heave portions 502 can have a protruding top portion void of material. In other embodiments, the anti-heave portions 502 can be solid.

As shown, the anti-heave portions 502 can be hollow. It will be appreciated that the anti-heave portions 502 can be filled with air, dirt, a cement, or a polymer material. It will further be appreciated that corner protector 102 can include a varying number of anti-heave portions 502. For example, 1, 2, 3, 4, 5, 6, 7, 8, 9, 10, 11, 12, 13, or 14 anti-heave portions 502 can be included. In embodiments the number of anti-heave portions 502 can be in range wherein any of the foregoing number of anti-heave portions 502 can serve as the upper or lower bound of the range, provided that the upper bound is greater than the lower bound.

Figure 6:
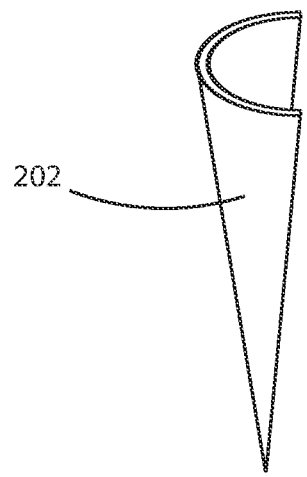
FIG. 6 is a schematic side view of a central protrusion in accordance with various embodiments herein.

Referring now to FIG. 6, a side view of the central protrusion 202 is shown in accordance with various embodiments herein. As shown, the central protrusion 202 can be hollow. Further, the central protrusion 202 can be a hemiconical shape. It will be appreciated that the hemiconical shape can encompass a corner of the fiberglass box pad (not shown in this view) thereby protecting the corner from any damage that can occur. As described above, the fiberglass box pad is protected from damage because the central protrusion 202 can absorb the force of an impact.

Figure 7:
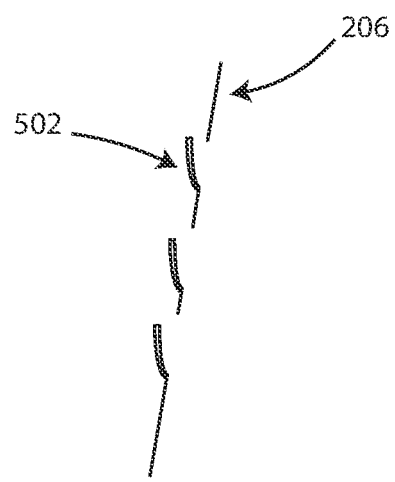
FIG. 7 is a schematic side view of a plurality of anti-heave portions in accordance with various embodiments herein.

Referring now to FIG. 7, a side view of the anti-heave portions 502 is shown in accordance with various embodiments herein. As shown, the anti-heave portions 502 can protrude out from the pointed blade 206 at an angle. For example, the anti-heave portions 502 can protrude out from the pointed blade 206 at a 30, 45, 60, or 75-degree angle. In embodiments the angle can be in range wherein any of the foregoing angles can serve as the upper or lower bound of the range, provided that the upper bound is greater than the lower bound. It will be appreciated that the anti-heave portions 502 are angled to resist any upward forces, for example ground heave, that could dislodge the corner protector (not shown in this view).

Figure 8:
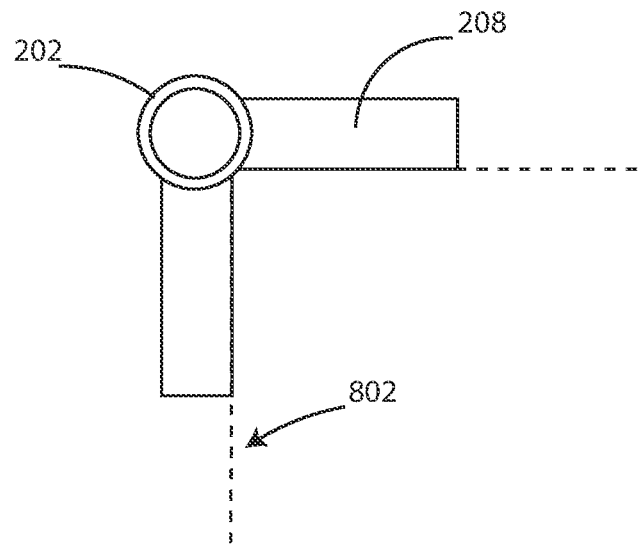
FIG. 8 is a schematic top view of a corner protector in accordance with various embodiments herein.

In various embodiments, the lip 208 of the corner protector 102 can be installed on the fiberglass box pad 100 in various ways. Referring now to FIG. 8, a top view of corner protector 102 is shown in accordance with various embodiments herein. In some embodiments, the lip 208 can be positioned such that the lip 208 abuts a top edge 802 of the fiberglass box pad (not shown in this view). In some embodiments, the lip 208 can have the same thickness as the plates of the corner protector (not shown in this view) which can allow the corner protector to be flush with the walls of the fiberglass box pad. Additionally, as shown, the central protrusion 202 can surround a corner of the fiberglass box pad without the corner penetrating the hollow interior of the central protrusion 202. Instead, the central protrusion 202 remains adjacent the corner of the fiberglass box pad while still providing protection from any impacts that can occur.

Figure 9:
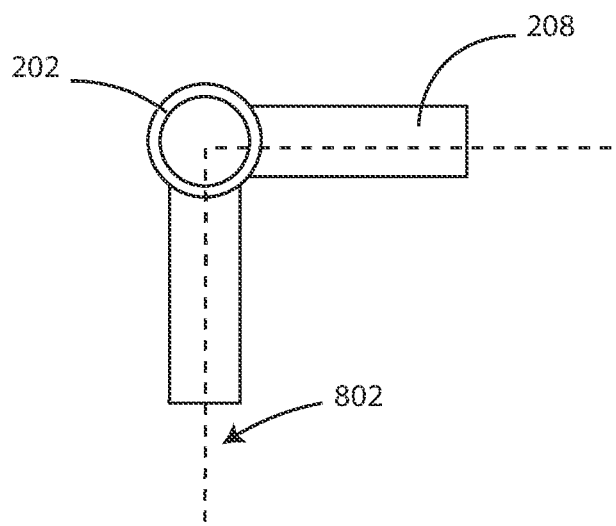
FIG. 9 is a schematic top view of a corner protector in accordance with various embodiments herein.

Alternatively, the lip 208 can be positioned over the top edge 802 of the fiberglass box pad 100. Referring now to FIG. 9, a top view of a corner protector 102 is shown in accordance with various embodiments herein. As shown, the lip 208 can be positioned such that the lip 208 is positioned over the top edge 802 of the fiberglass box pad (now shown in this view). In some embodiments the lip 208 can extend perpendicularly from the plates (not shown in this view) such that the lip 208 has a width that is greater than the thickness of the plates. Such positioning can allow a corner of the fiberglass box pad to be encompassed by the hollow interior of the central protrusion 202. It will be appreciated that positioning the lip 208 over the top edge 802 of the fiberglass box pad can secure the corner protector to the fiberglass box pad. It will further be appreciated that securing the lip 208 to the top edge 802 of the fiberglass box pad can ensure the corner protector 102 reaches a desired depth when inserted into the surface (not shown in this view).

Figure 11:
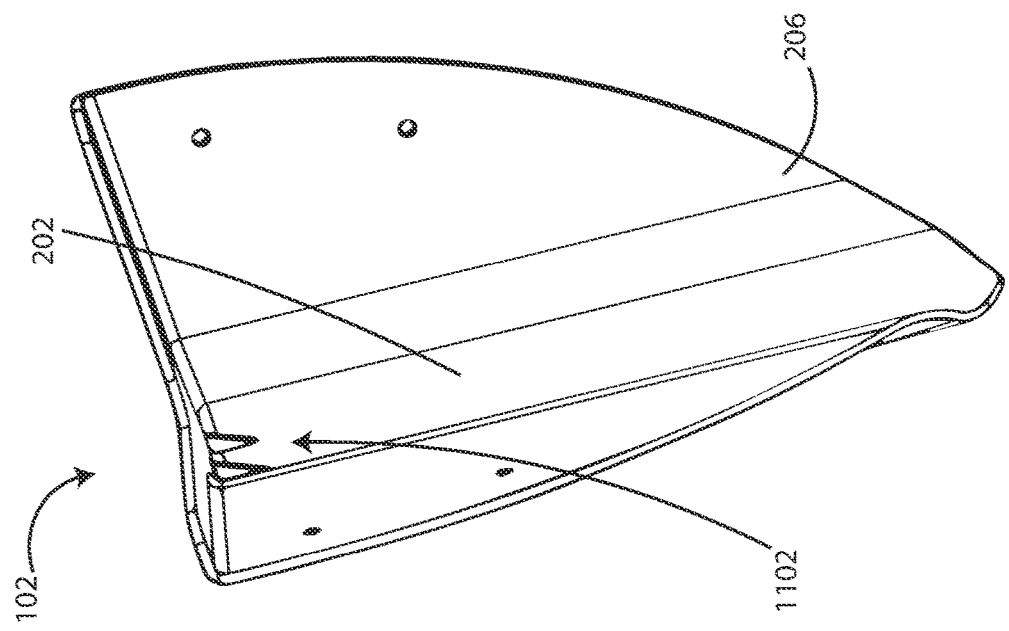
FIG. 11 is a schematic rear view of the alternative corner protector shown in FIG. 10.
Figure 10:
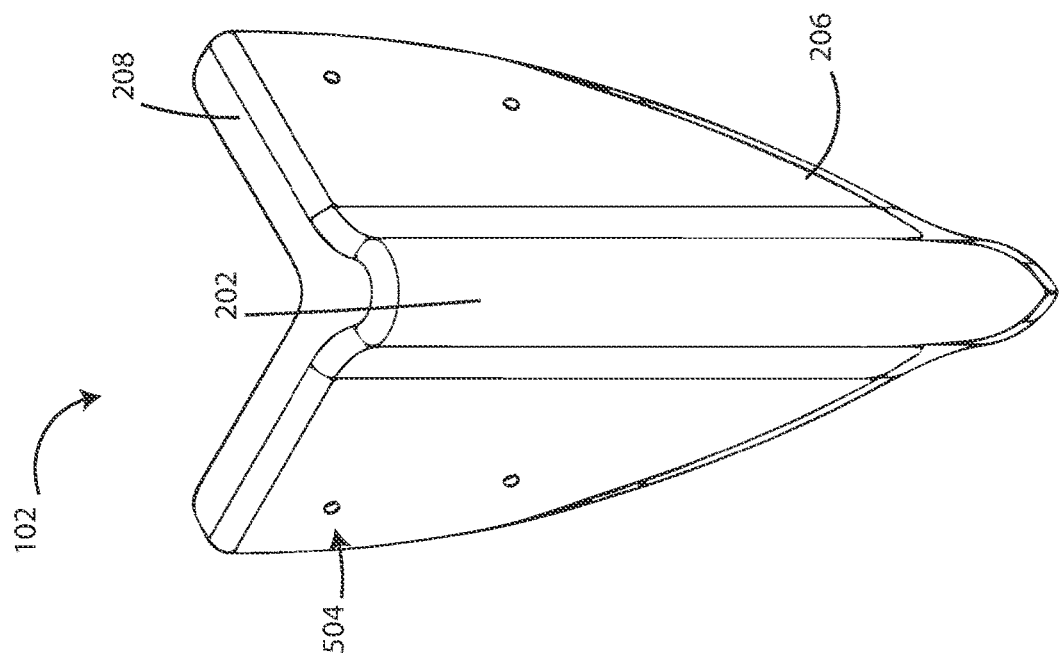
FIG. 10 is a schematic front view of an alternative corner protector in accordance with various embodiments herein.

It will be appreciated that the corner protector 102 can have various shapes, sizes, and features. Below are some exemplary embodiments of corner protectors 102 and their features. Referring now to FIG. 10, a front view of corner protector 102 is shown in accordance with various embodiments herein. The corner protector 102 can include central protrusion 202, pointed blade 206, lip 208, and one or more holes 504 discussed in detail above. Referring now to FIG. 11, a rear view of the corner protector 102 shown in FIG. 10 is shown in accordance with various embodiments herein. The corner protector 102 can include one or more reinforcement portions 1102 positioned in the interior of the central protrusion 202 distal the pointed blade 206. The reinforcement portions 1102 can provide additional structural support to the central protrusion 202. It will be appreciated that the reinforcement portions 1102 can strengthen the central protrusion 202 which can be an impact point for a hammer during the installation process of the corner protector 102. Additionally, it will be appreciated that the reinforcement portions 1102 can strengthen the central protrusion 202 after installation thereby providing additional protection to the most vulnerable spot on the fiberglass box pad (not shown in this view), its corner edges.

Figure 13:
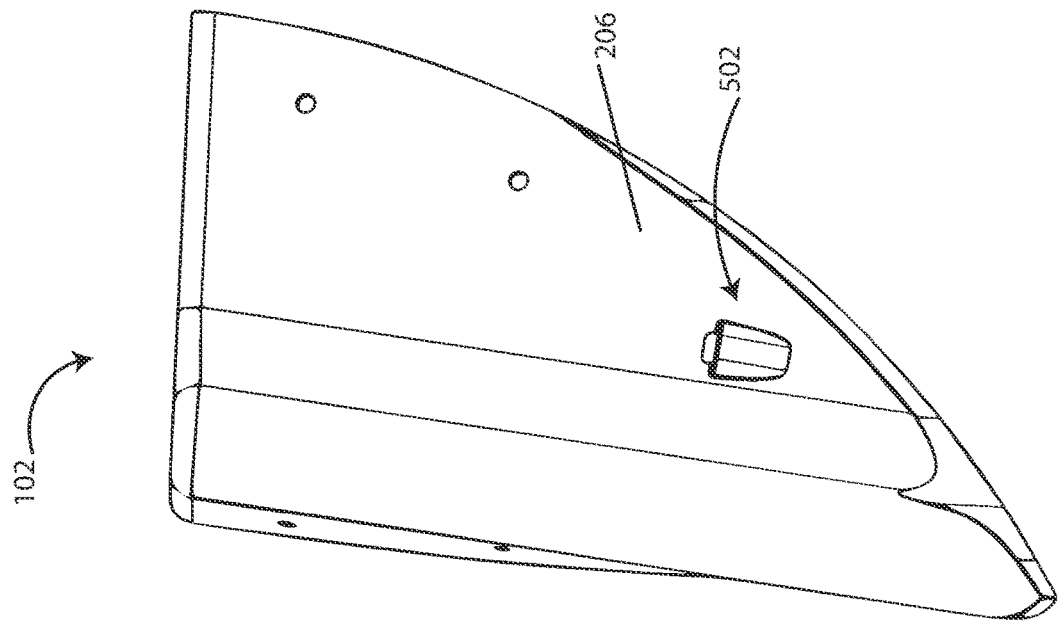
FIG. 13 is a schematic side view of the alternative corner protector shown in FIG. 12.
Figure 12:
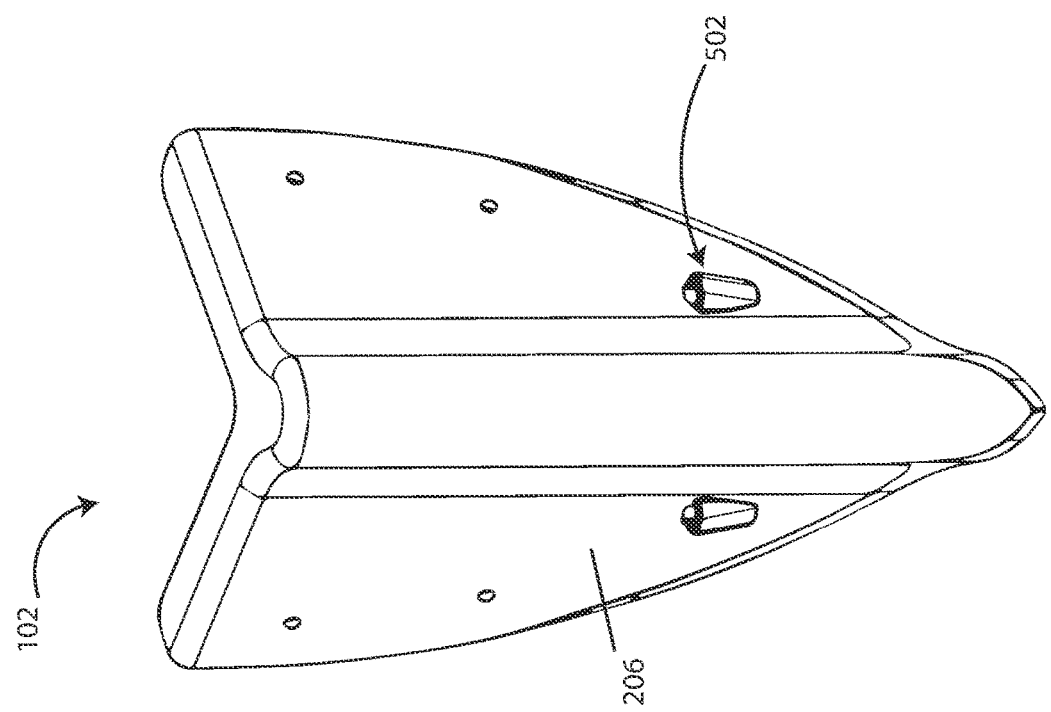
FIG. 12 is a schematic front view of an alternative corner protector in accordance with various embodiments herein.

The corner protector 102 can additionally include anti-heave portions 502. Referring now to FIG. 12, a front view of corner protector 102 is shown in accordance with various embodiments herein. The corner protector 102 can include a pointed blade 206. The pointed blade 206 can include one or more anti-heave portions 502, discussed in detail above. Referring to FIG. 13, a side view of the corner protector 102 shown in FIG. 12 is shown in accordance with various embodiments herein. As shown, the anti-heave portion 502 protrudes outward from the pointed blade 206.

Figure 14:
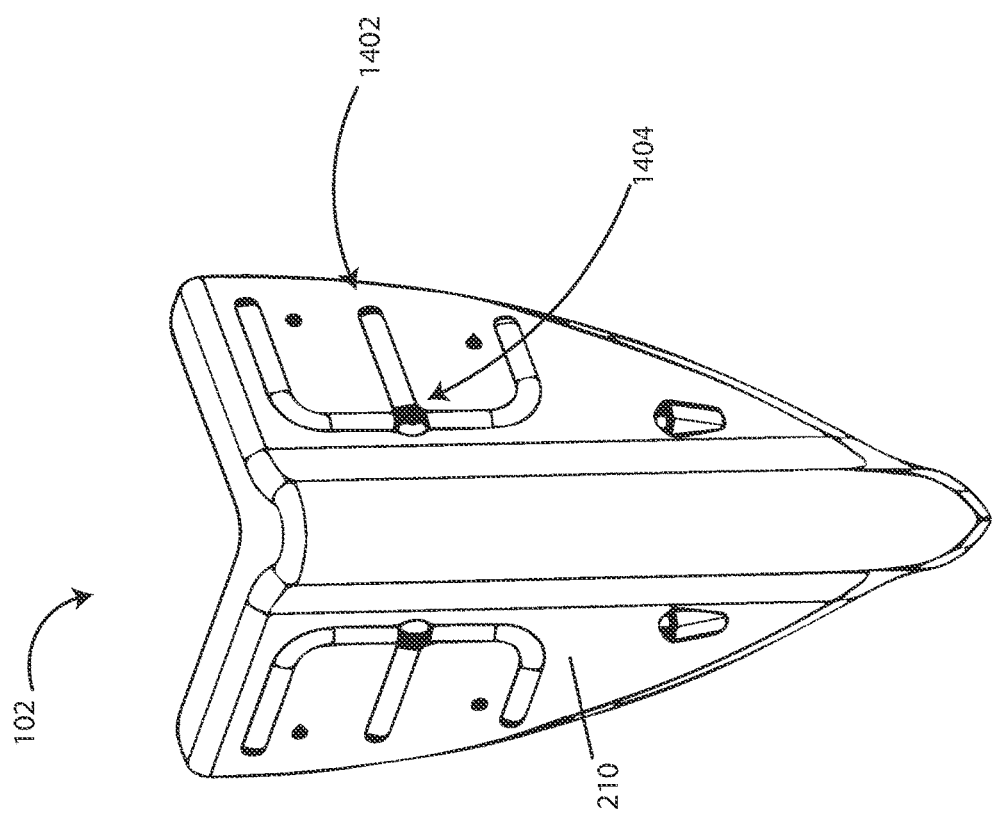
FIG. 14 is a schematic front view of an alternative corner protector in accordance with various embodiments herein.

The corner protector 102 can further include glue channels. Referring now to FIG. 14, a front view of corner protector 102 is shown in accordance with various embodiments herein. The corner protector 102 can further include one or more glue channels 1402 positioned on the plates 210. In some embodiments, the glue channels 1402 can include a glue injection hole 1404. The glue channels 1402 can be varying shapes and sizes. It will be appreciated that the more channels provided in the glue channels 1402, the more glue will be dispersed on the plates 210, and therefore the better the corner protector 102 can adhere to the fiberglass box pad (not shown in this view). In some embodiments, the glue injection hole 1404 can allow a person to inject glue into the glue channels 1402 after the corner protector 102 is installed on the fiberglass box pad. If glue is injected after installation, it can be noted that the glue injection hole 1404 can allow glue to be inserted into a central point and the force of the injection of the glue will allow the glue to disperse all throughout the glue channels 1402 started from the glue injection hole 1404 and spreading outward from there. In other embodiments, a glue injection hole 1404 need not be included and a person can fill the glue channels 1402 prior to installation of the corner protector 102.

Figure 15:
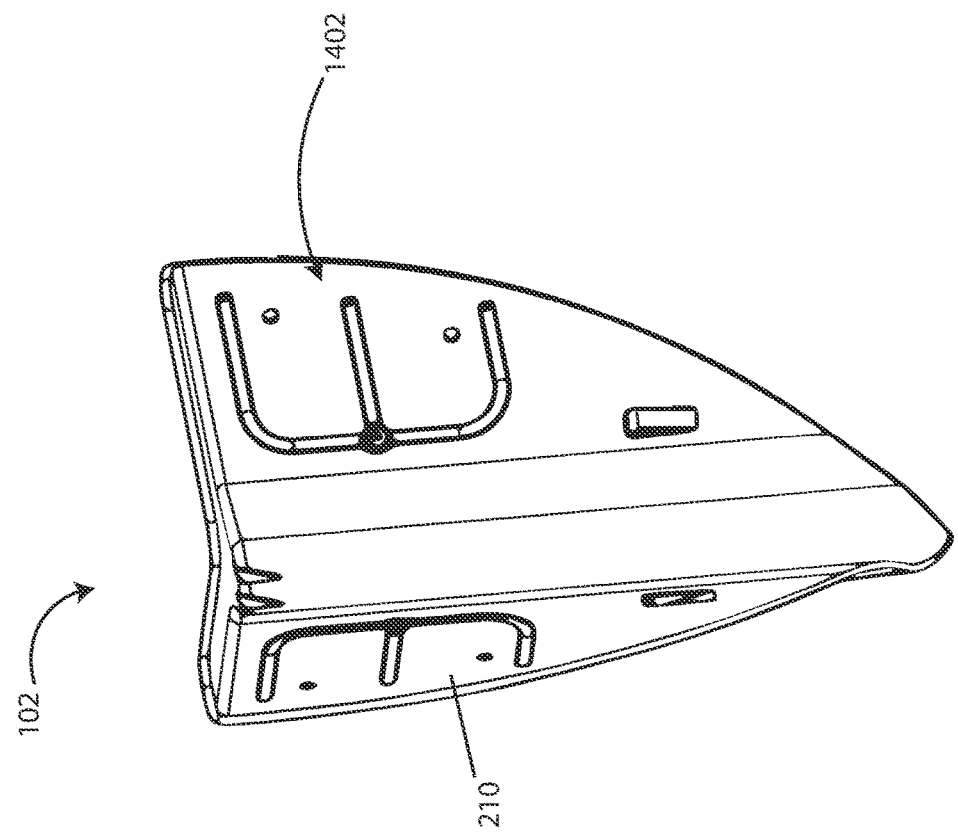
FIG. 15 is a schematic rear view of the alternative corner protector shown in FIG. 14.

Referring now to FIG. 15, a rear view of the corner protector 102 shown in FIG. 14 is shown in accordance with various embodiments herein. As shown, the glue channels 1402 can protrude outward from the plates 210. This protrusion can allow for glue to pool in the channels of the glue channels 1402.

Figure 16:
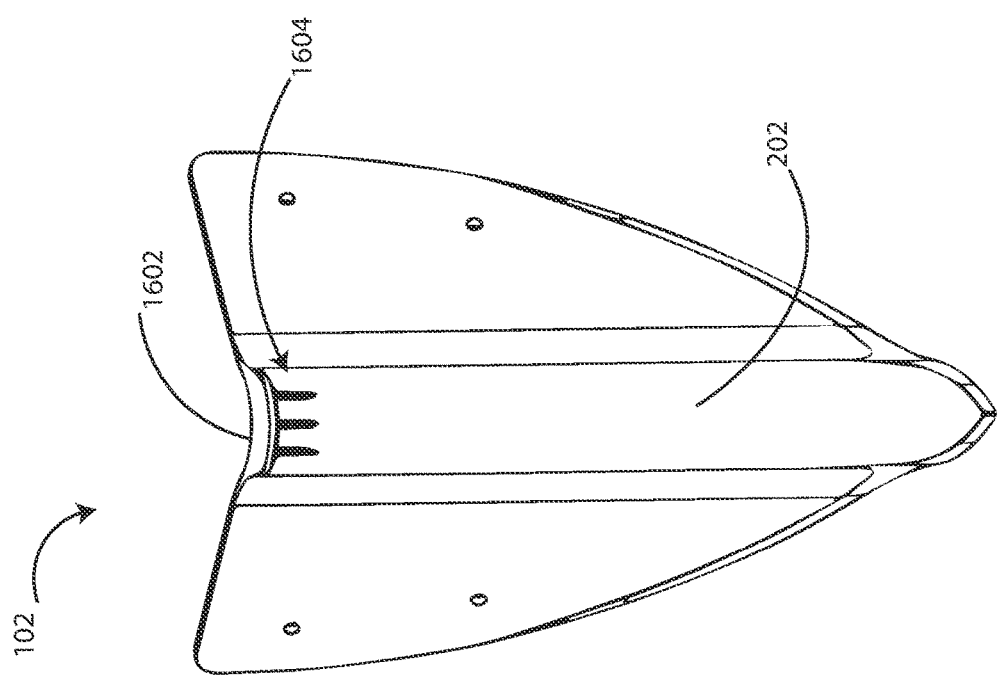
FIG. 16 is a schematic front view of an alternative corner protector in accordance with various embodiments herein.

Referring now to FIG. 16, an alternative exemplary embodiment of the corner protector 102 is shown in accordance with various embodiments herein. The corner protector 102 can include a central protrusion lip 1602. The central protrusion lip 1602 can include one or more central protrusion reinforcement portions 1604. Noticeably absent from the corner protector 102 is a lip as other embodiments include. In this embodiment however, only the central protrusion 202 includes central protrusion lip 1602 which extends outward perpendicularly from the central protrusion 202. In some embodiments, the central protrusion lip 1602 provides a substantially flat surface for a person to hammer or press the corner protector 102 into the surface (not shown in this view). The central protrusion reinforcement portions 1604 can strengthen the central protrusion lip 1602 which can be an impact point for a hammer during the installation process of the corner protector 102. Additionally, it will be appreciated that the central protrusion reinforcement portions 1604 can strengthen the central protrusion 202 after installation thereby providing additional protection to the most vulnerable spot on the fiberglass box pad (not shown in this view), its corner edges.

Figure 17:
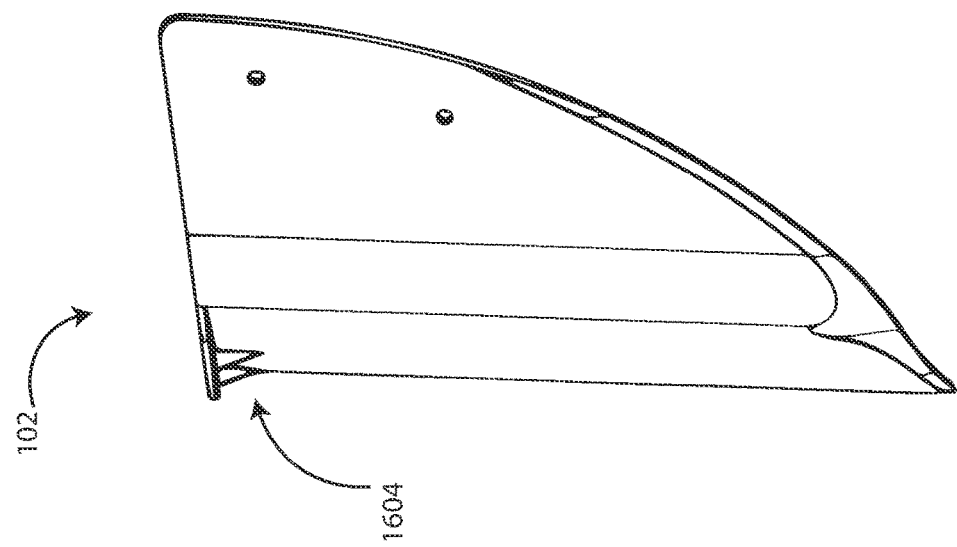
FIG. 17 is a schematic side view of the alternative corner protector shown in FIG. 16.

Referring now to FIG. 17, a side view of the corner protector 102 shown in FIG. 16 is shown in accordance with various embodiments herein. As shown, the central protrusion reinforcement portions 1604 protrude outward from the central protrusion 202. It will be appreciated that corner protector 102 can include a varying number of central protrusion reinforcement portions 1604. For example, 1, 2, 3, or 4 central protrusion reinforcement portions 1604 can be included. In embodiments the number of central protrusion reinforcement portions 1604 can be in range wherein any of the foregoing number of central protrusion reinforcement portions 1604 can serve as the upper or lower bound of the range, provided that the upper bound is greater than the lower bound.

Referring now to FIG. 18, a rear view of the corner protector 102 shown in FIG. 16 is shown in accordance with various embodiments herein. As shown, the corner protector 102 can include holes 504. The corner protector 102 can be installed on the fiberglass box pad (not shown in this view) using various fasteners.

Figure 19:
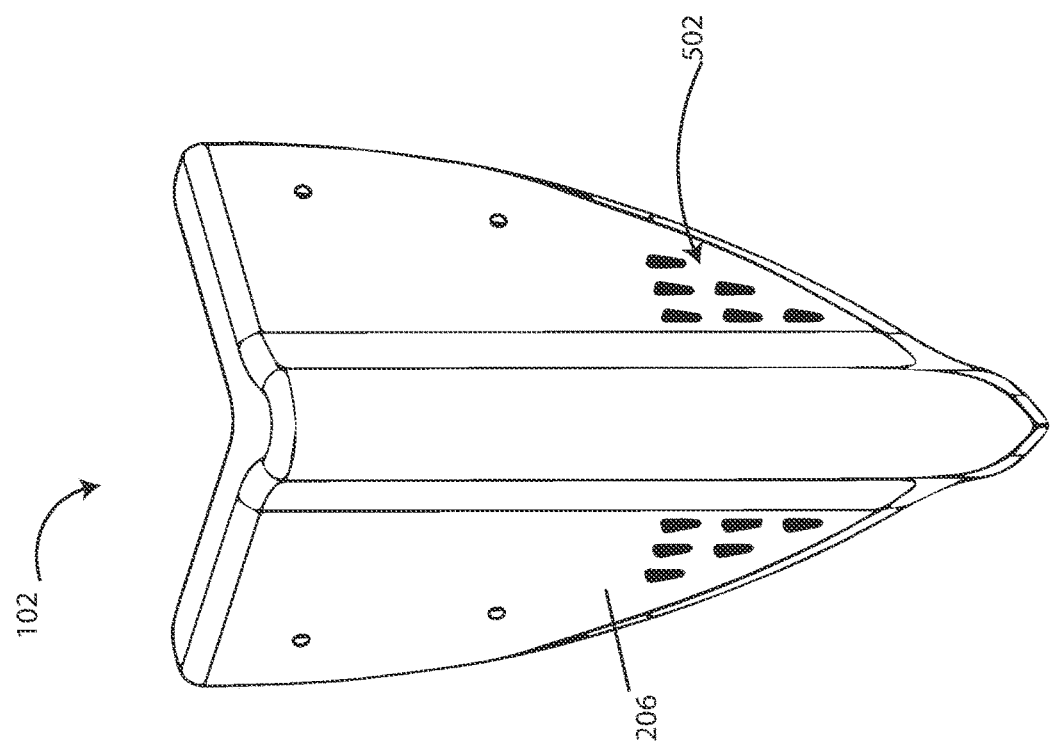
FIG. 19 is a schematic front view of an alternative corner protector in accordance with various embodiments herein.

In another exemplary embodiment, corner protector 102 can include anti-heave portions 502. Referring now to FIG. 19, a corner protector 102 is shown in accordance with various embodiments herein. The corner protector 102 can include pointed blade 206. The pointed blade 206 can include one or more anti-heave portions 502. In some embodiments, the anti-heave portions 502 are hollow. In other embodiments, as shown, the anti-heave portions 502 solid structural features. In some embodiments, one anti-heave portion 502 can be positioned on a side of the pointed blade 206. In other embodiments, a plurality of anti-heave portions 502 can be positioned on the pointed blade 206. As shown, each side of the pointed blade 206 includes a plurality of rows of anti-heave portions 502. Each row of the anti-heave portions 502 can include one more anti-heave portion 502 than the row preceding it. For example, a first row of the anti-heave portions 502 can include one anti-heave portion 502. A second row of the anti-heave portions 502 can include two anti-heave portions 502. And a third row of the anti-heave portions 502 can include three anti-heave portions 502.

Figure 20:
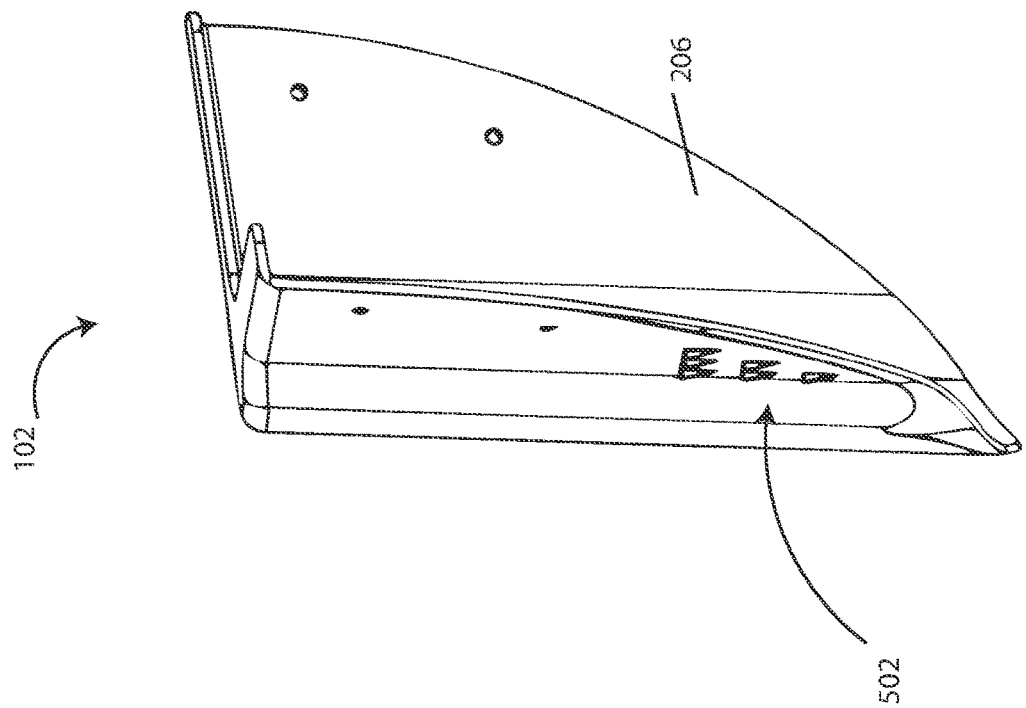
FIG. 20 is a schematic side view of the alternative corner protector shown in FIG. 19.

Referring now to FIG. 20, a side view of the corner protector 102 shown in FIG. 19 is shown in accordance with various embodiments herein. As shown, the anti-heave portions 502 can protrude outward from the pointed blade 206. It will be appreciated that the anti-heave portions 502 are angled to resist any upward forces, for example ground heave, that could dislodge the corner protector 102. Referring now to FIG. 21, a rear view of the corner protector 102 shown in FIG. 19 is shown in accordance with various embodiments herein. The corner protector 102 includes reinforcement portions 1102, discussed in detail above. Noticeably, the anti-heave portions (not shown in this view) do not extend through the pointed blade 206.

Figure 22:
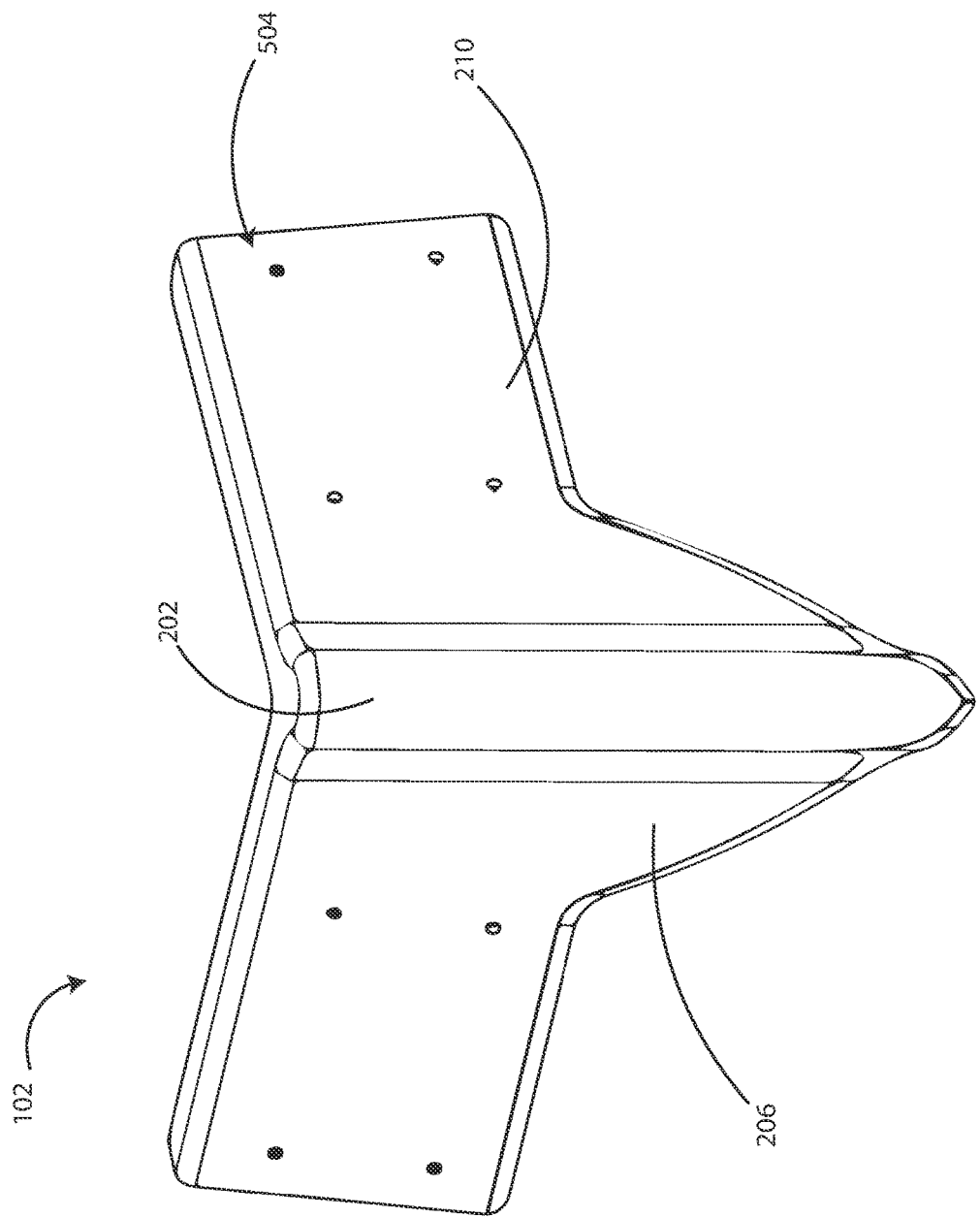
FIG. 22 is a schematic front view of an alternative corner protector in accordance with various embodiments herein.

In another exemplary embodiment, a corner protector 102 can include one or more plates 210. Referring now to FIG. 22, a front view of corner protector 102 is shown in accordance with various embodiments herein. The corner protector 102 can include central protrusion 202, pointed blade 206, and one or more plates 210 discussed in detail above. In some embodiments, the plates 210 can include one or more holes 504. For example, as shown, each plate 210 can include 4 holes 504 for fasteners. The plates 210 can have varying lengths. It will be appreciated that increasing the length of the plates 210 can increase the amount of the fiberglass box pad (not shown in this view) covered. Additionally, it will be appreciated that increasing the length of the plates 210 can better distribute a force from an impact. In some embodiments, each plate 210 can be 4 to 12 inches in length. However, in some embodiments, the plate 210 can be about 4, 5, 6, 7, 8, 9, 10, 11, or 12 inches in length. In embodiments the length can be in range wherein any of the foregoing lengths can serve as the upper or lower bound of the range, provided that the upper bound is greater than the lower bound.

Figure 23:
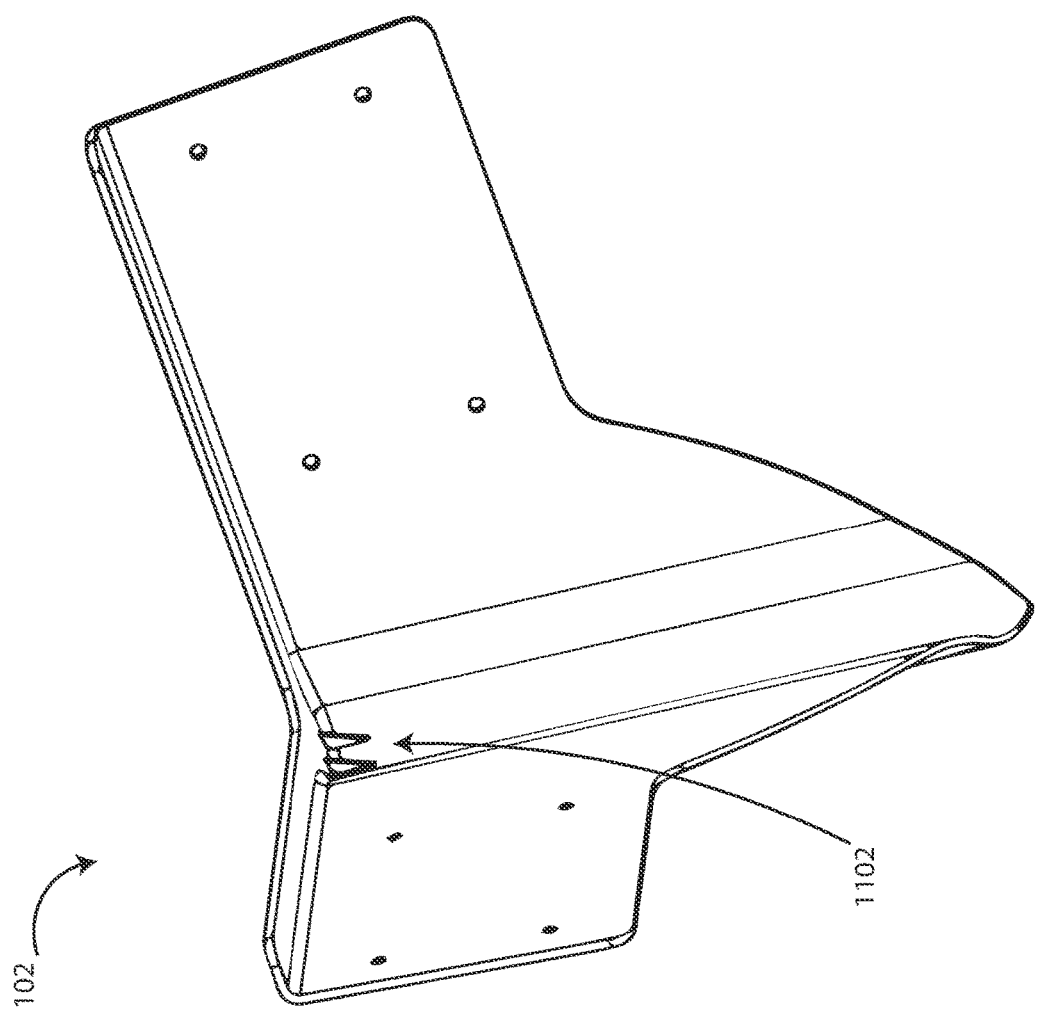
FIG. 23 is a schematic rear view of the alternative corner protector shown in FIG. 22.

Referring now to FIG. 23, a rear view of corner protector 22 shown in FIG. 22 is shown in accordance with various embodiments herein. The corner protector 22 can include one or more reinforcement portions 1102, discussed in detail above.

Figure 24:
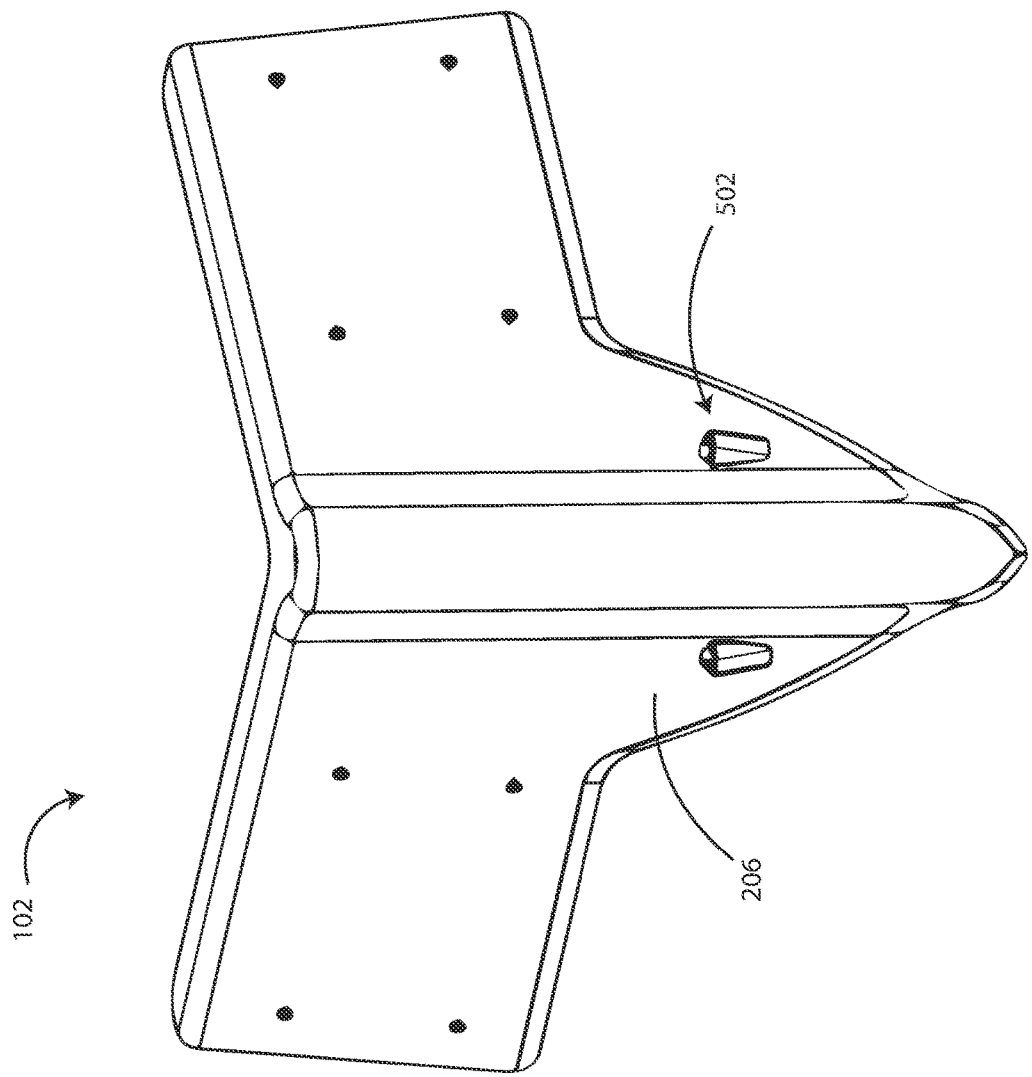
FIG. 24 is a schematic front view of an alternative corner protector in accordance with various embodiments herein.

The corner protector 102 can additionally include anti-heave portions 502. Referring now to FIG. 24, a front view of corner protector 102 is shown in accordance with various embodiments herein. The corner protector 102 can include a pointed blade 206. The pointed blade 206 can include one or more anti-heave portions 502, discussed in detail above.

Figure 25:
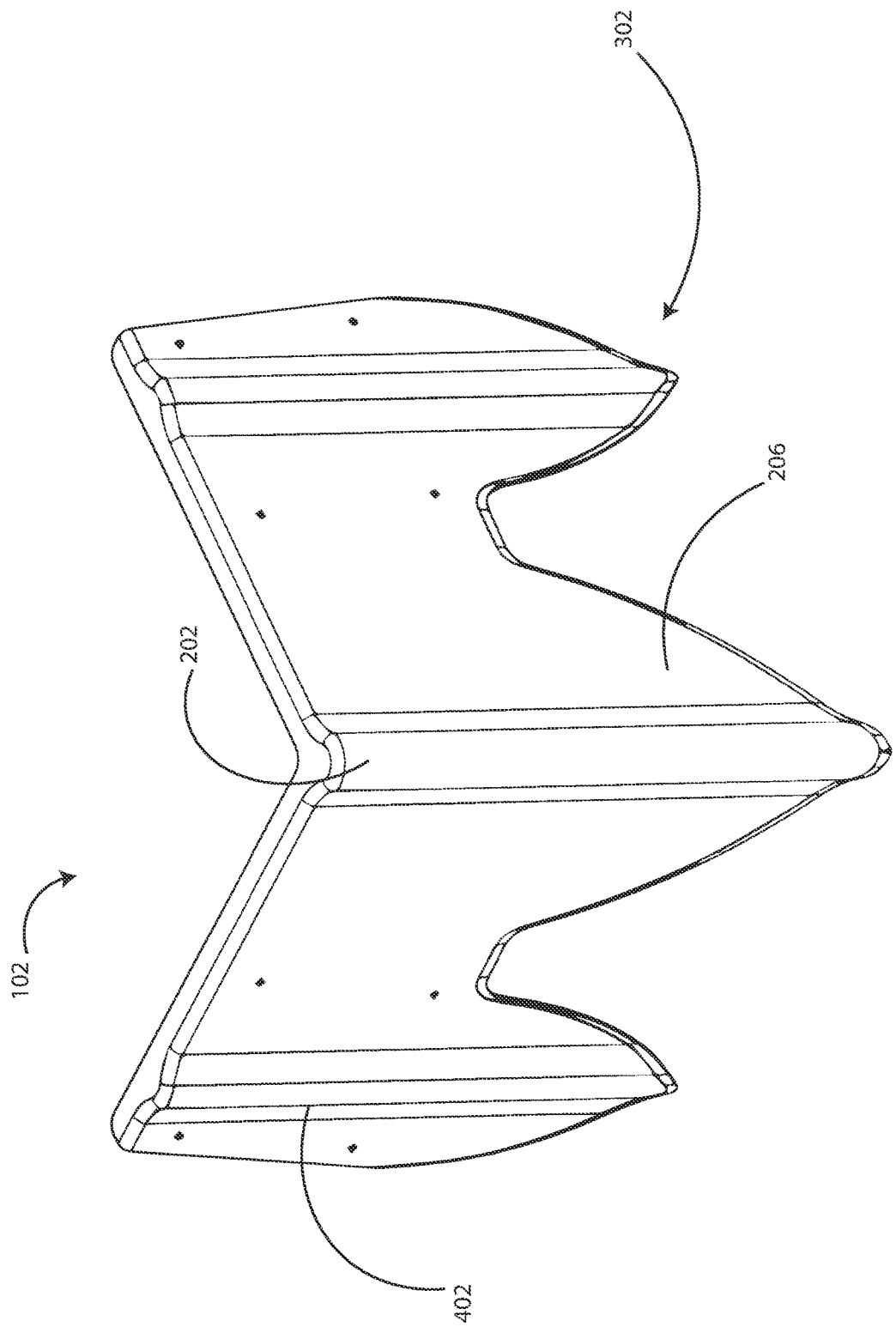
FIG. 25 is a schematic front view of an alternative corner protector in accordance with various embodiments herein.
Figure 26:
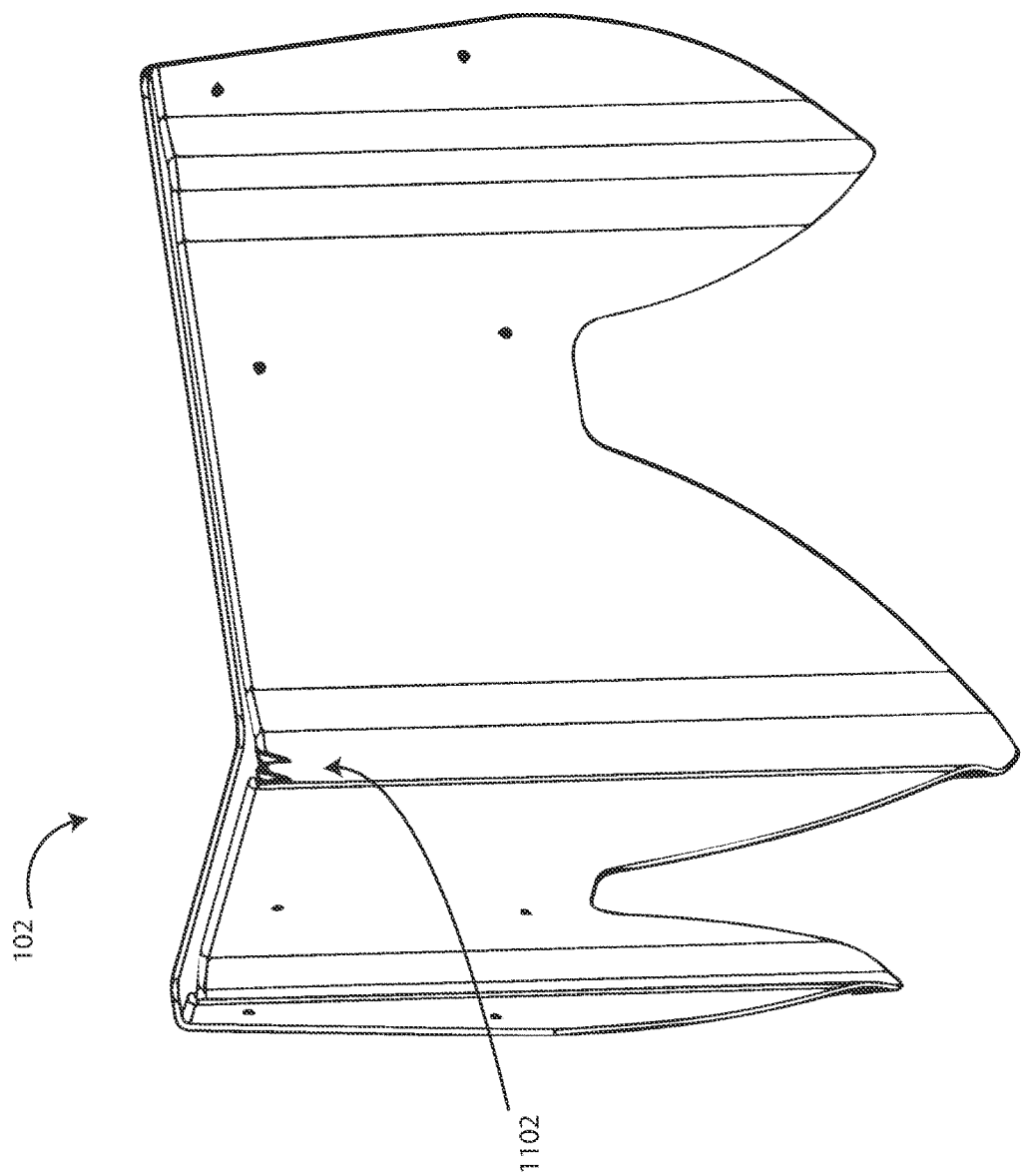
FIG. 26 is a schematic rear view of the alternative corner protector shown in FIG. 25.

In another exemplary embodiment, a corner protector 102 can include one or more side protrusions 402. Referring now to FIG. 25, a front view of corner protector 102 is shown in accordance with various embodiments herein. The corner protector 102 can include central protrusion 202, pointed blade 206, side protrusions 402, and tapered edges 302 discussed in detail above. In some embodiments, the pointed blade 206 can extend beyond the length of tapered edge 302. In other embodiments, the pointed blade 206 and the tapered edges 302 can extend to the same length. In other embodiments, the tapered edges 302 can extend beyond the length of the pointed blade 206. Referring now to FIG. 26, a rear view of the corner protector 102 shown in FIG. 25 is shown in accordance with various embodiments herein. The corner protector 102 can include one or more reinforcement portions 1102, discussed in detail above.

Figure 27:
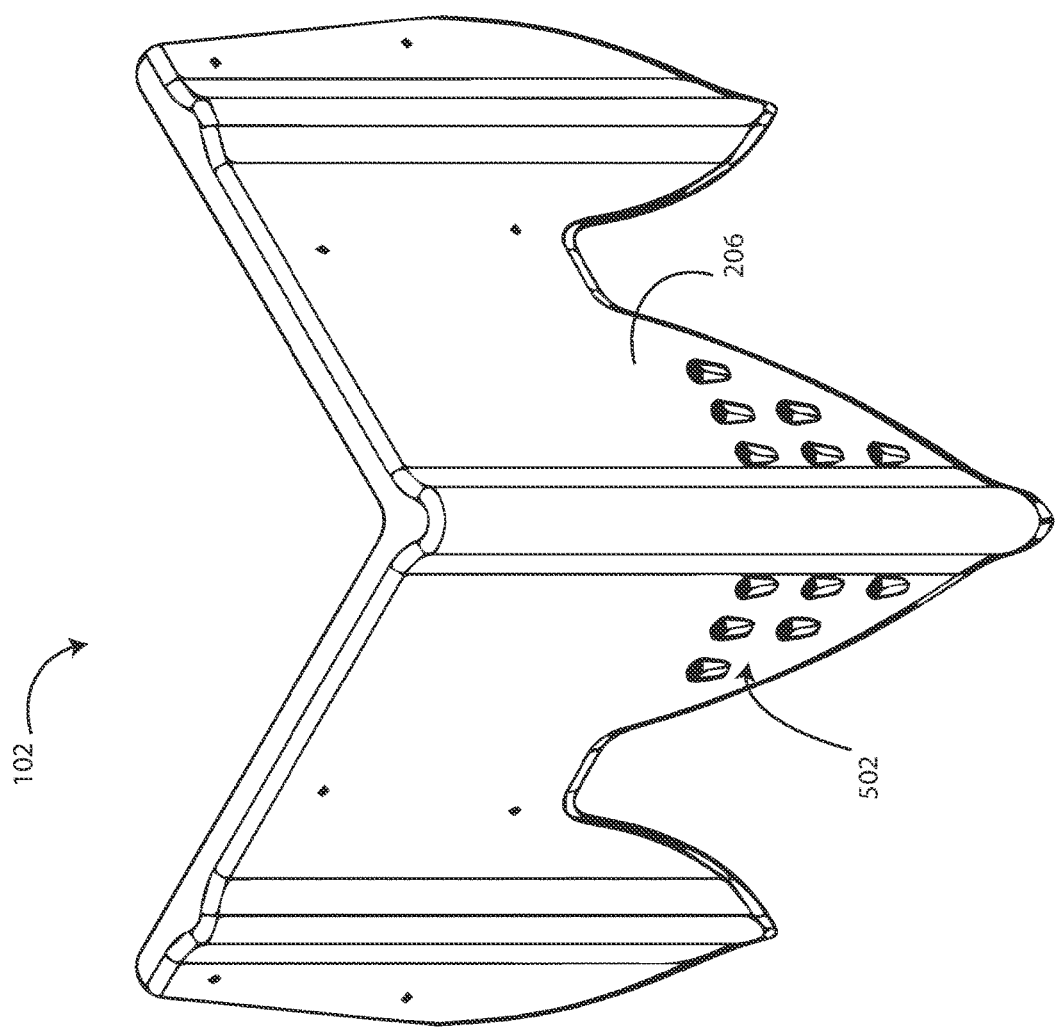
FIG. 27 is a schematic front view of an alternative corner protector in accordance with various embodiments herein.
Figure 28:
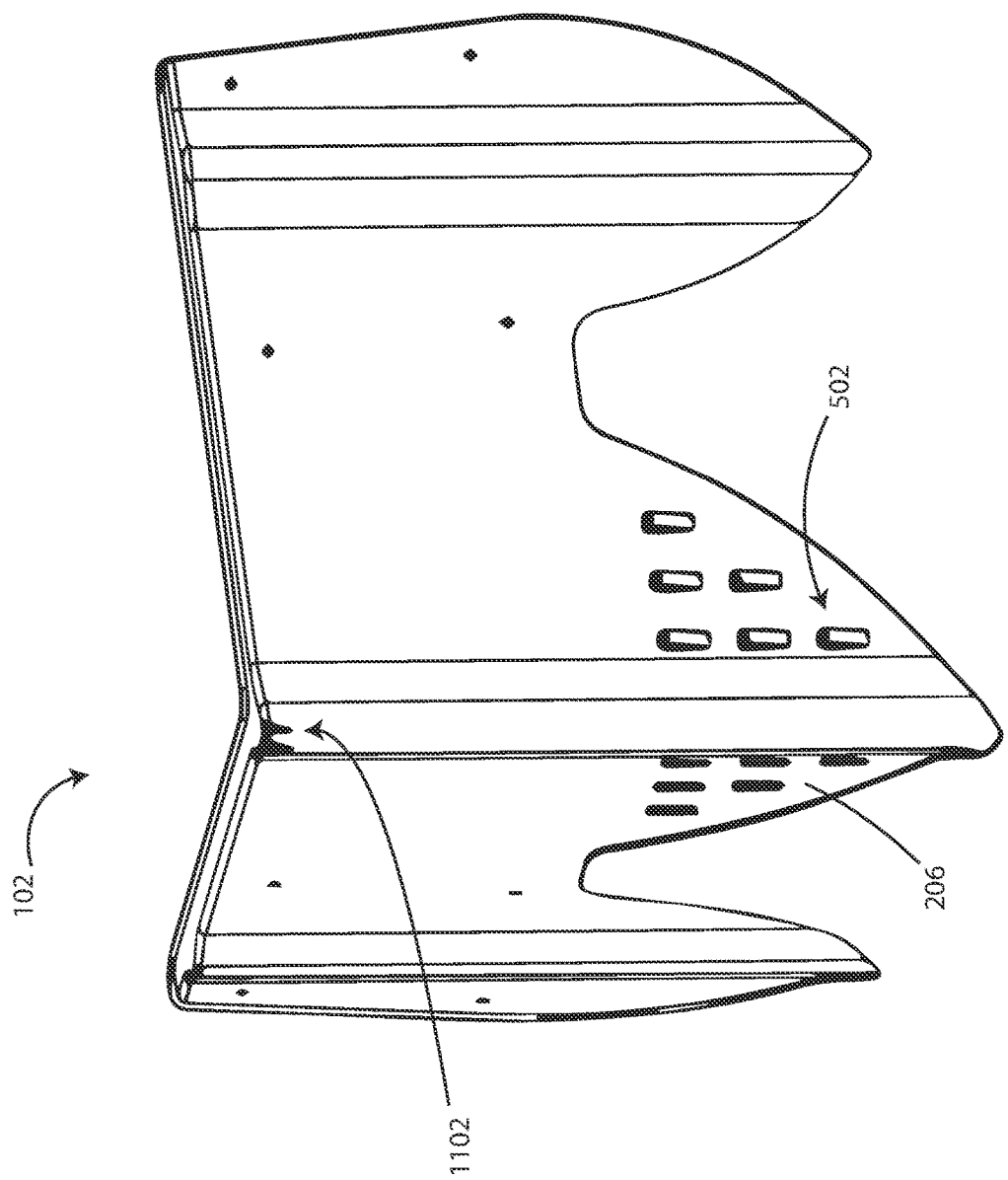
FIG. 28 is a schematic rear view of the alternative corner protector shown in FIG. 27.

The corner protector 102 can additionally include anti-heave portions 502. Referring now to FIG. 27, a front view of corner protector 102 is shown in accordance with various embodiments herein. The corner protector 102 can include pointed blade 206. The pointed blade 206 can include one or more anti-heave portions 502, discussed in detail above. Referring now to FIG. 28, a rear view of the corner protector 102 shown in FIG. 27 is shown in accordance with various embodiments herein. The corner protector 102 can include one or more reinforcement portions 1102. Additionally, as shown, the anti-heave portions 502 can extend outward from the pointed blade 206, thereby creating recesses behind the anti-heave portions 502 that can be filled with air, dirt, or a polymer material.

Figure 29:
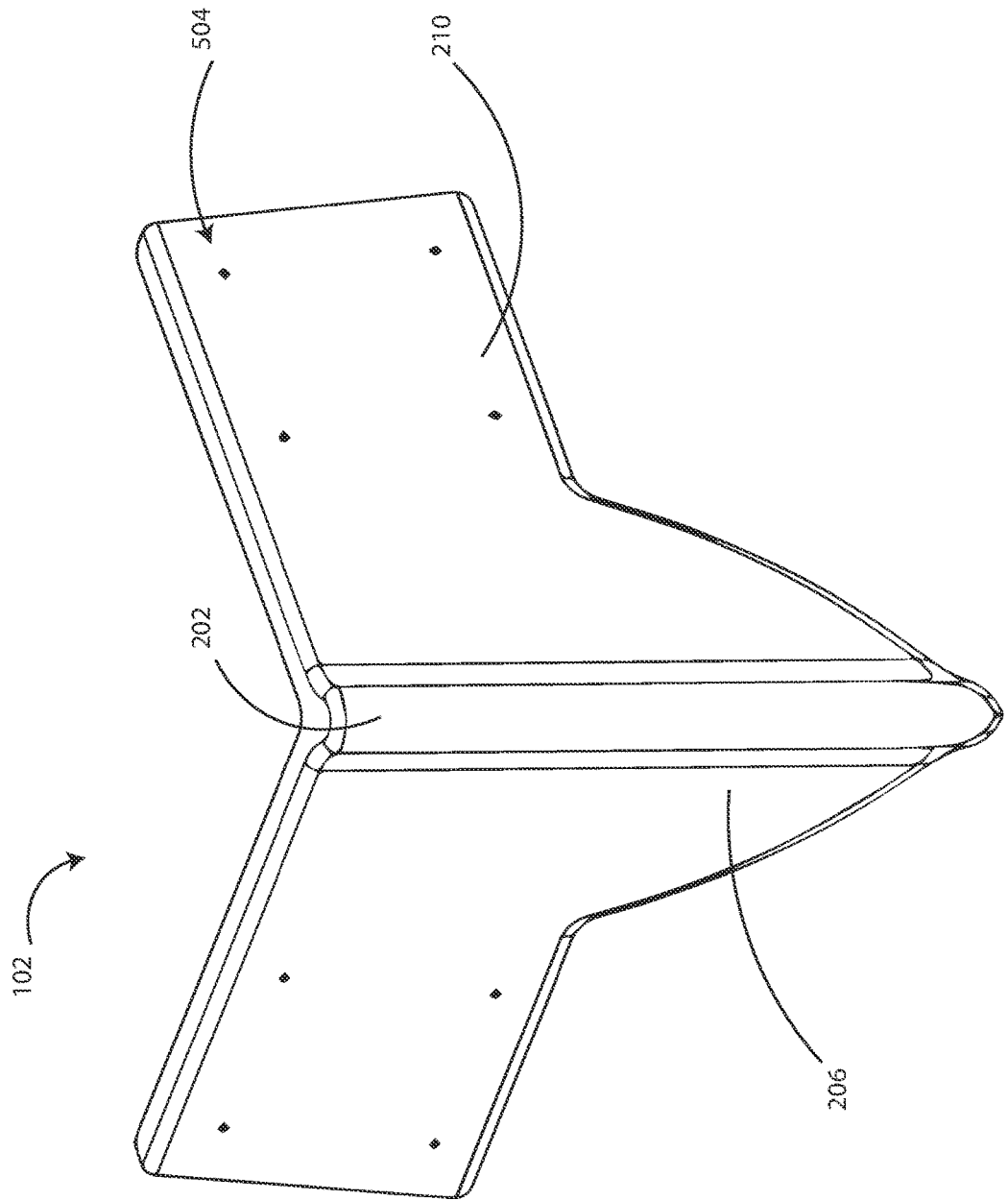
FIG. 29 is a schematic front view of an alternative corner protector in accordance with various embodiments herein.

In another exemplary embodiment, a corner protector 102 can include one or more plates 210. Referring now to FIG. 29, a front view of corner protector 102 is shown in accordance with various embodiments herein. The corner protector 102 can include central protrusion 202, pointed blade 206, and one or more plates 210 discussed in detail above. In some embodiments, the plates 210 can include one or more holes 504. For example, as shown, each plate 210 can include 4 holes 504 for fasteners. In some embodiments, the plates 210 can have a greater length than other embodiments. The plates 210 can have varying lengths. In some embodiments, each plate 210 can be 13 to 20 inches in length. However, in some embodiments, the plate 210 can be about 11, 12, 13, 14, 15, 16, 17, 18, 19, 20, 21, or 22 inches in length. In embodiments the length can be in range wherein any of the foregoing lengths can serve as the upper or lower bound of the range, provided that the upper bound is greater than the lower bound.

Figure 30:
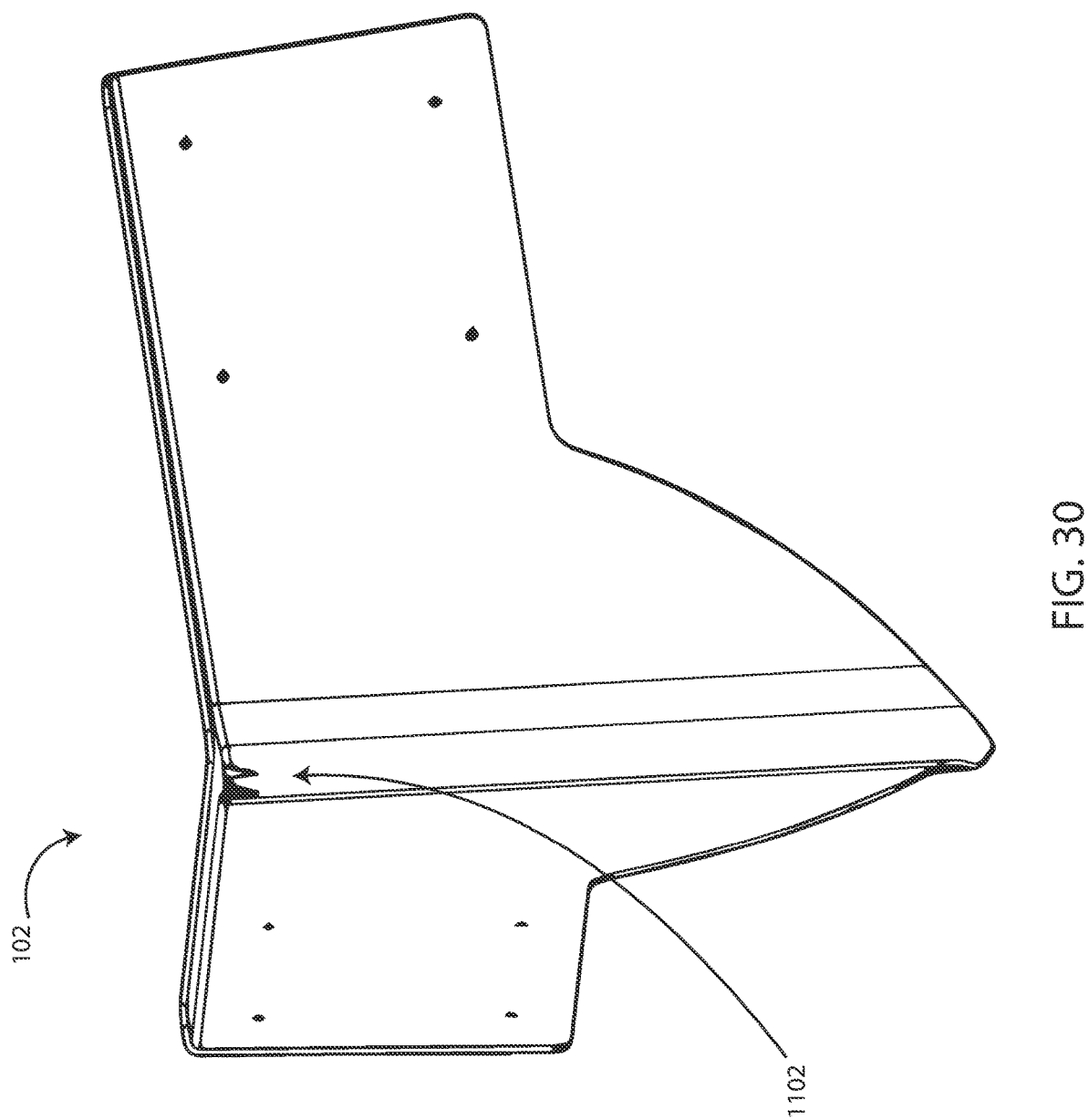
FIG. 30 is a schematic rear view of the alternative corner protector shown in FIG. 29.

Referring now to FIG. 30, a rear view of the corner protector 102 shown in FIG. 29 is shown in accordance with various embodiments herein. The corner protector 102 can include one or more reinforcement portions 1102, discussed in detail above.

Figure 31:
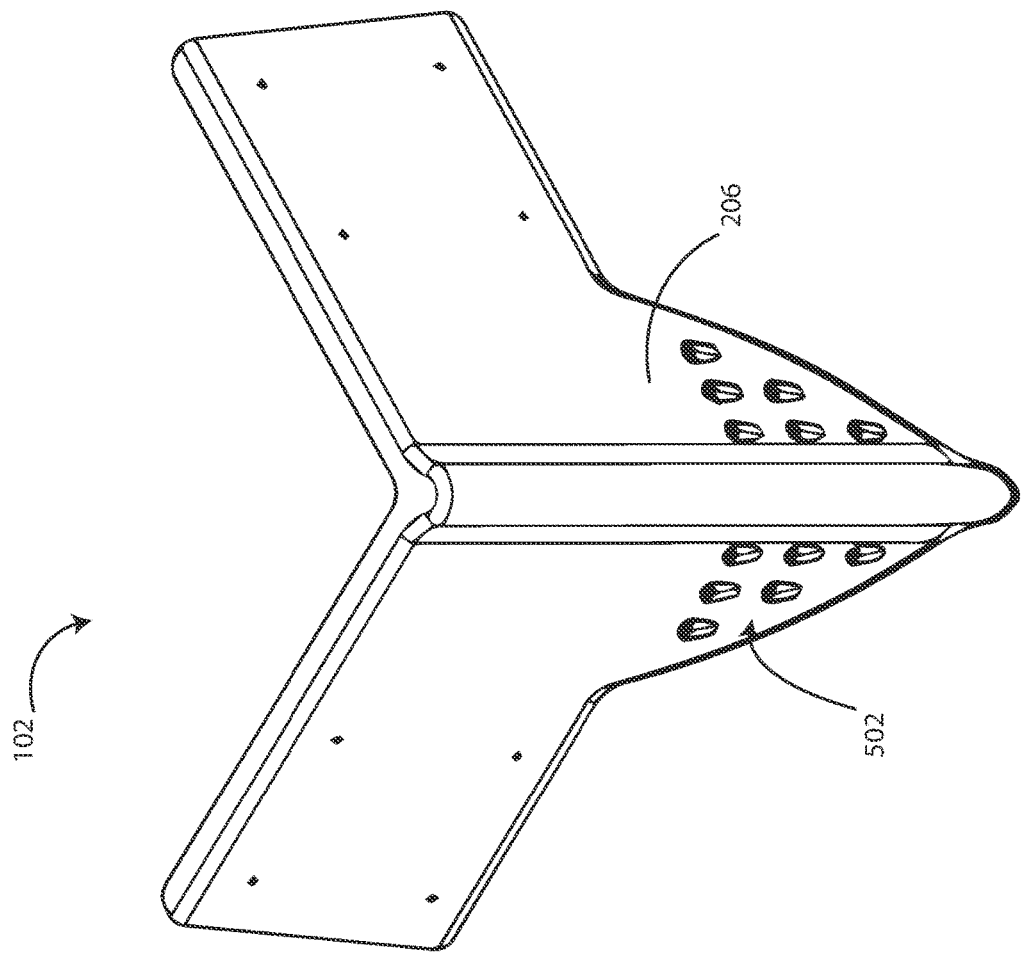
FIG. 31 is a schematic front view of an alternative corner protector in accordance with various embodiments herein.
Figure 32:
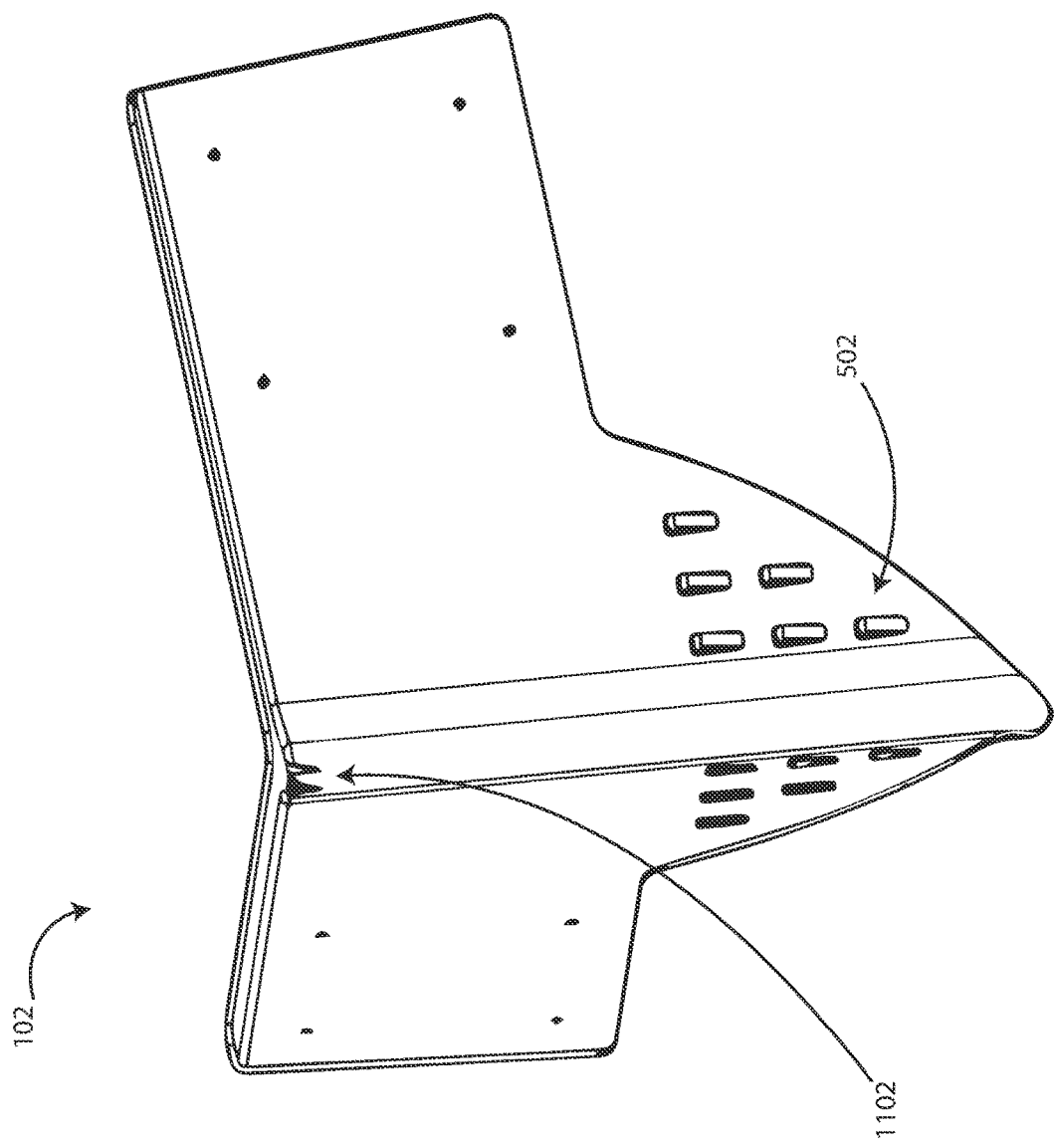
FIG. 32 is a schematic rear view of the alternative corner protector shown in FIG. 31.

The corner protector 102 can additionally include anti-heave portions 502. Referring now to FIG. 31, a front view of corner protector 102 is shown in accordance with various embodiments herein. The corner protector 102 can include pointed blade 206. The pointed blade 206 can include one or more anti-heave portions 502, discussed in detail above. Referring now to FIG. 32, a rear view of the corner protector 102 shown in FIG. 31 is shown in accordance with various embodiments herein. The corner protector 102 can include one or more reinforcement portions 1102. Additionally, as shown, the anti-heave portions 502 can extend outward from the pointed blade 206, thereby creating recesses behind the anti-heave portions 502 that can be filled with air, dirt, or a polymer material.

Figure 33:
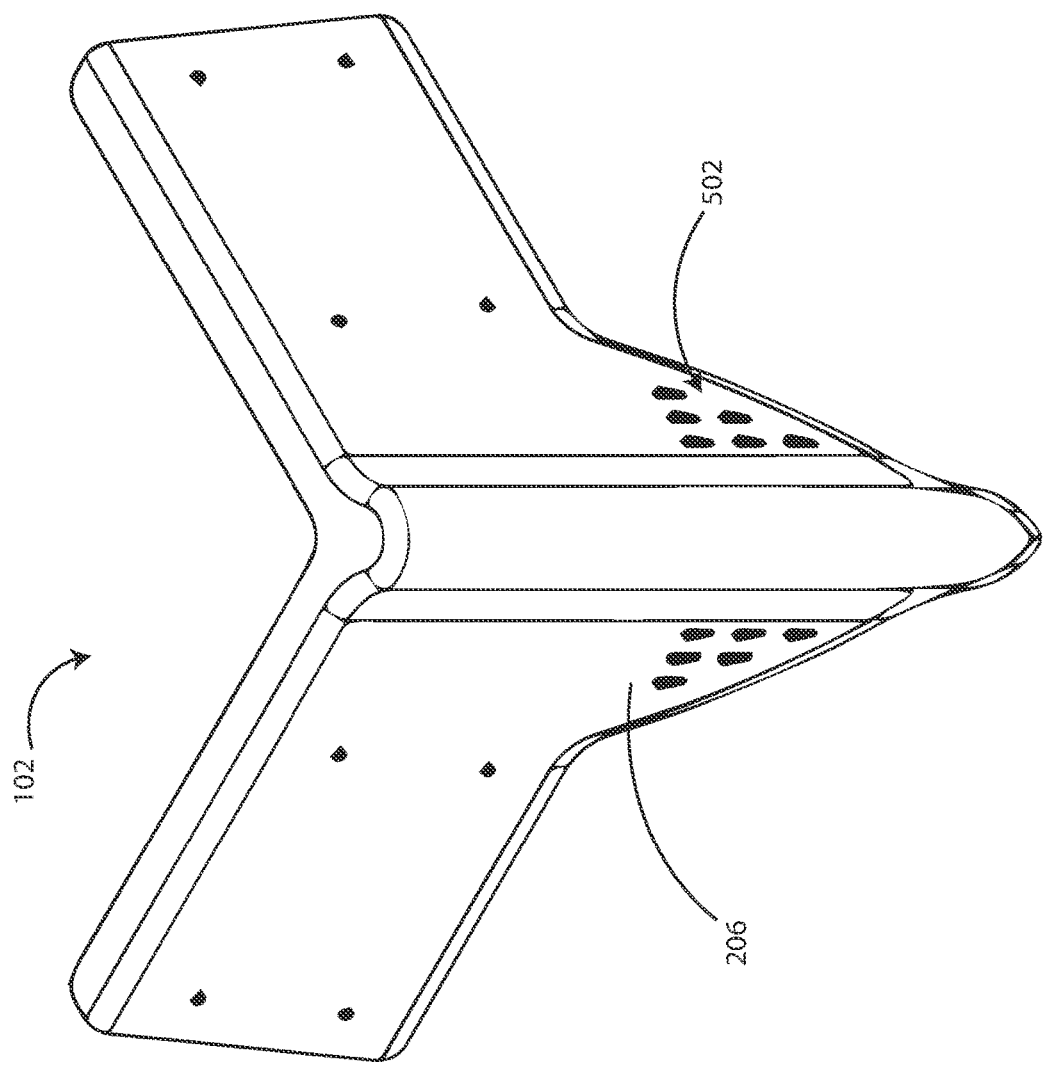
FIG. 33 is a schematic front view of an alternative corner protector in accordance with various embodiments herein.
Figure 34:
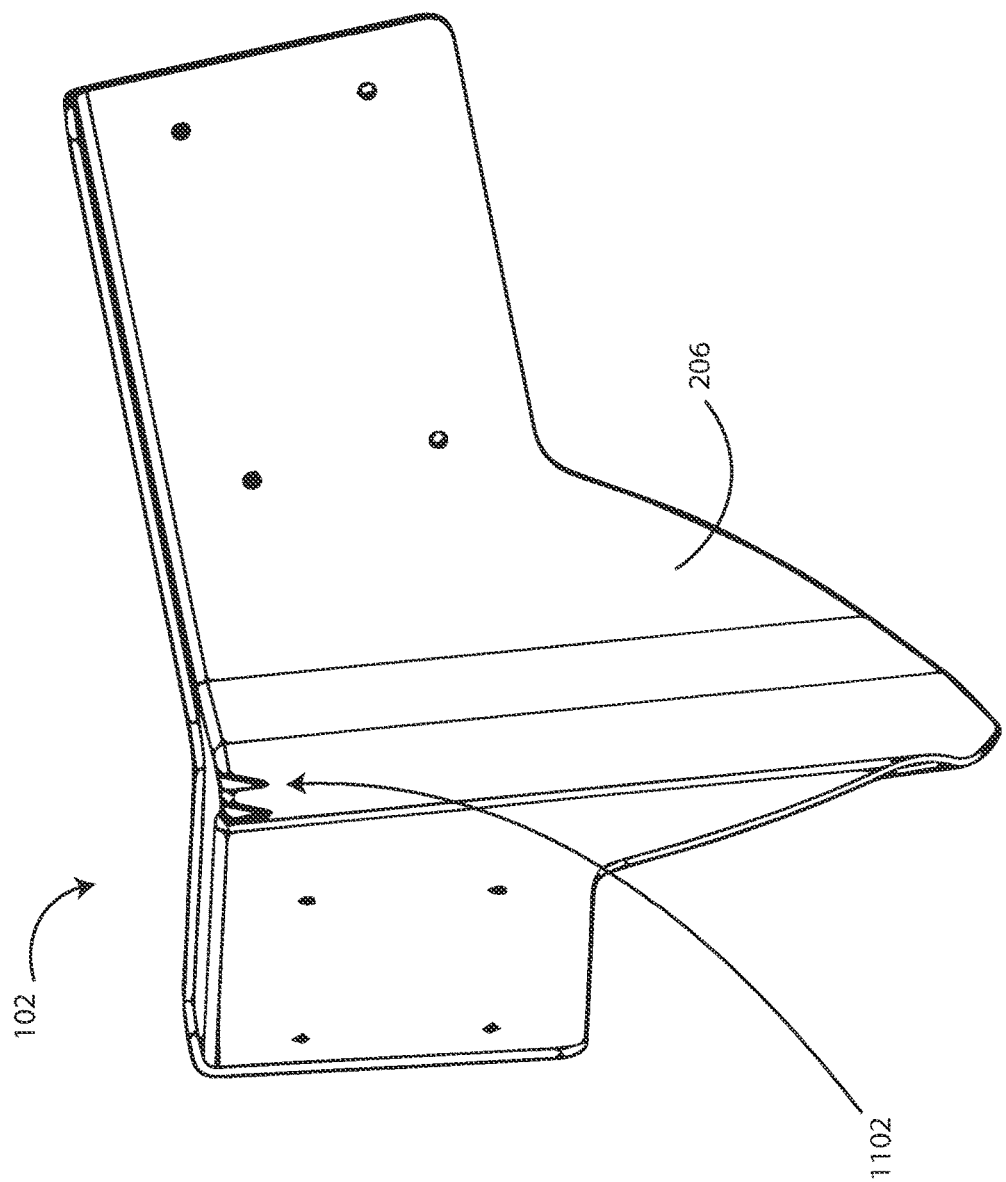
FIG. 34 is a schematic rear view of the alternative corner protector shown in FIG. 33.

The corner protector 102 can alternatively include anti-heave portions 502 that do not have recesses. Referring now to FIG. 33, a front view of corner protector 102 is shown in accordance with various embodiments herein. The corner protector 102 can include pointed blade 206. The pointed blade 206 can include one or more anti-heave portions 502. Referring now to FIG. 34, a rear view of the corner protector 102 shown in FIG. 33 is shown in accordance with various embodiments herein. The corner protector 102 can include one or more reinforcement portions 1102. Notably, it is shown the anti-heave portions (not shown in this view) do not extend through from the pointed blade 206. Instead, the anti-heave portions are solid portions that extend from the pointed blade 206.

Figure 35:
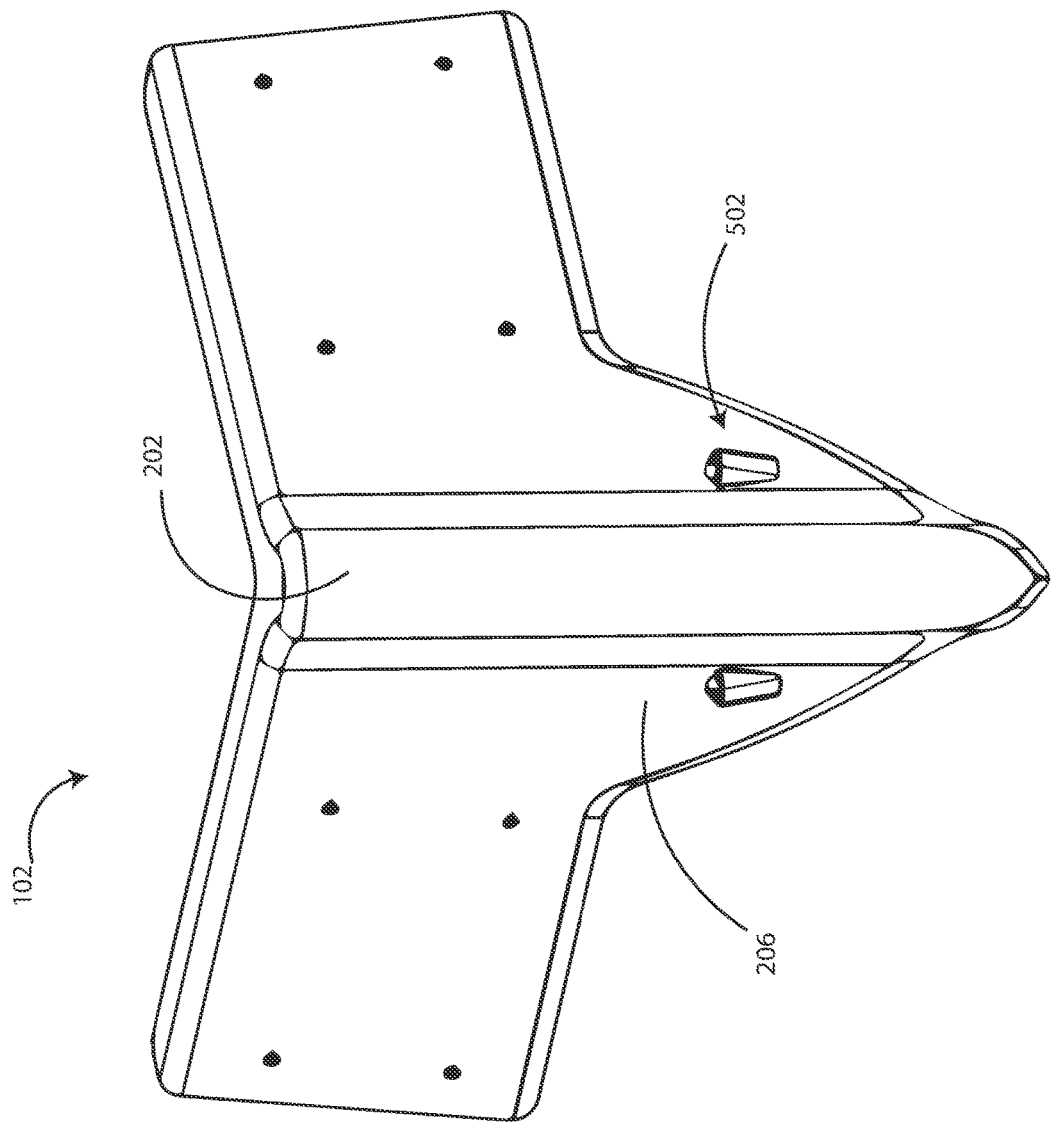
FIG. 35 is a schematic front view of an alternative corner protector in accordance with various embodiments herein.
Figure 36:
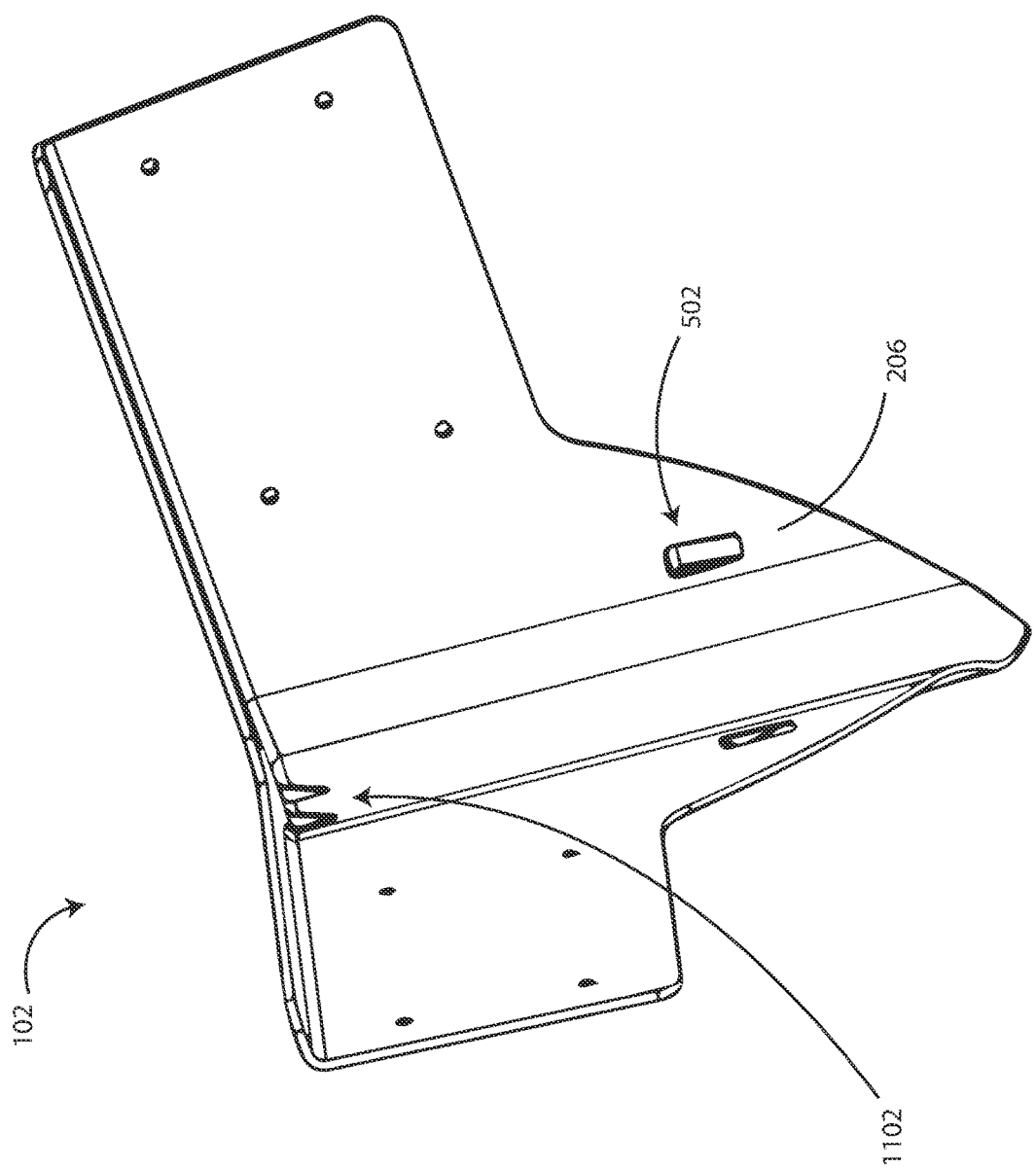
FIG. 36 is a schematic rear view of the alternative corner protector shown in FIG. 35.

Instead of including a plurality of anti-heave portions 502, the corner protector 102 can include a single anti-heave portion 502 on the pointed blade 206. Referring now to FIG. 35, a front view of corner protector 102 is shown in accordance with various embodiments herein. As shown, central protrusion 202 bisects the pointed blade 206 into two sides. Each side of the pointed blade 206 can include one anti-heave portion 502, discussed in detail above. Referring now to FIG. 36, a rear view of the corner protector 102 shown in FIG. 35 is shown in accordance with various embodiments herein. The corner protector 102 can include one or more reinforcement portions 1102. Additionally, as shown, the anti-heave portions 502 can extend outward through the pointed blade 206, thereby creating recesses behind the anti-heave portions 502, discussed in detail above.

Figure 37:
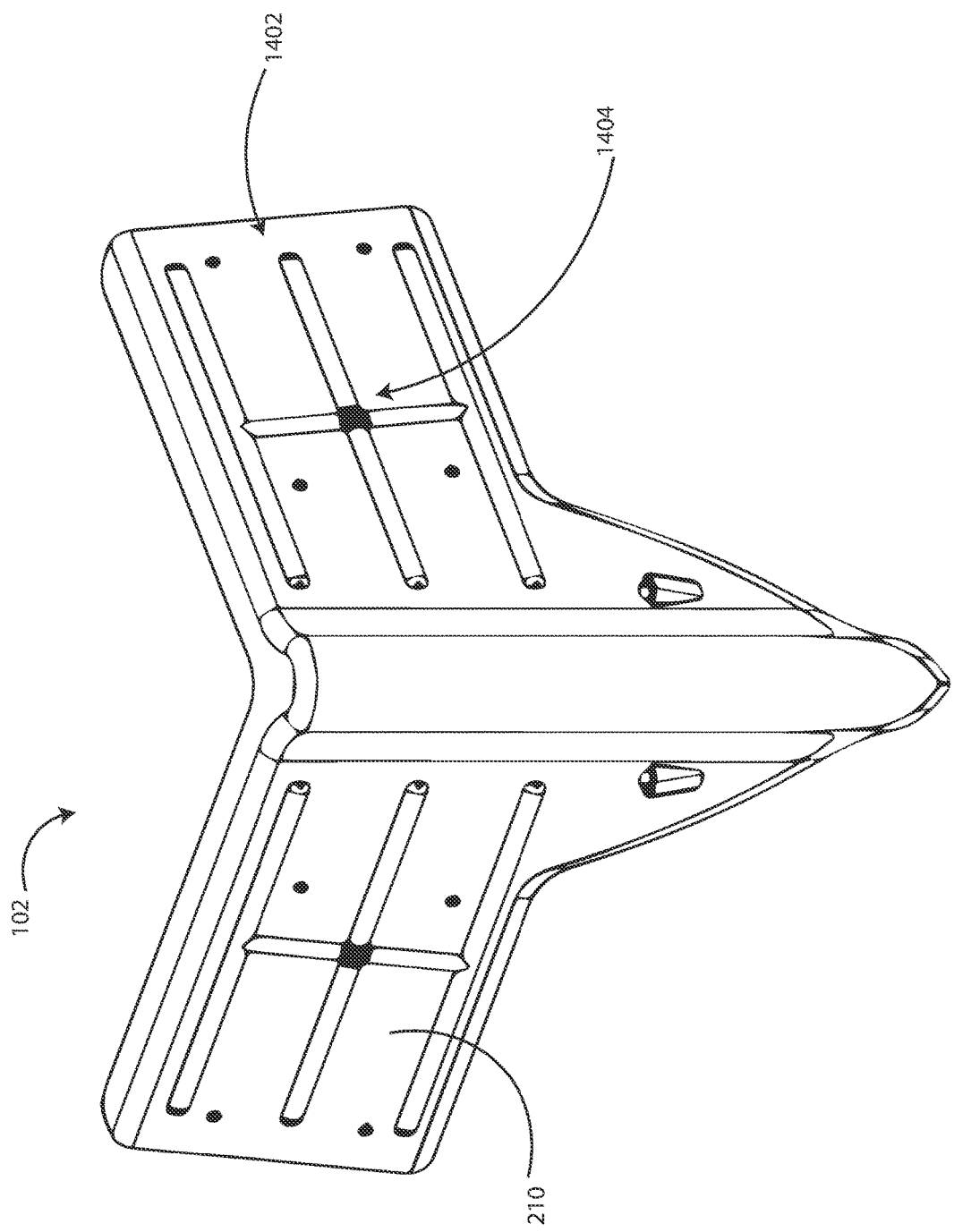
FIG. 37 is a schematic front view of an alternative corner protector in accordance with various embodiments herein.
Figure 38:
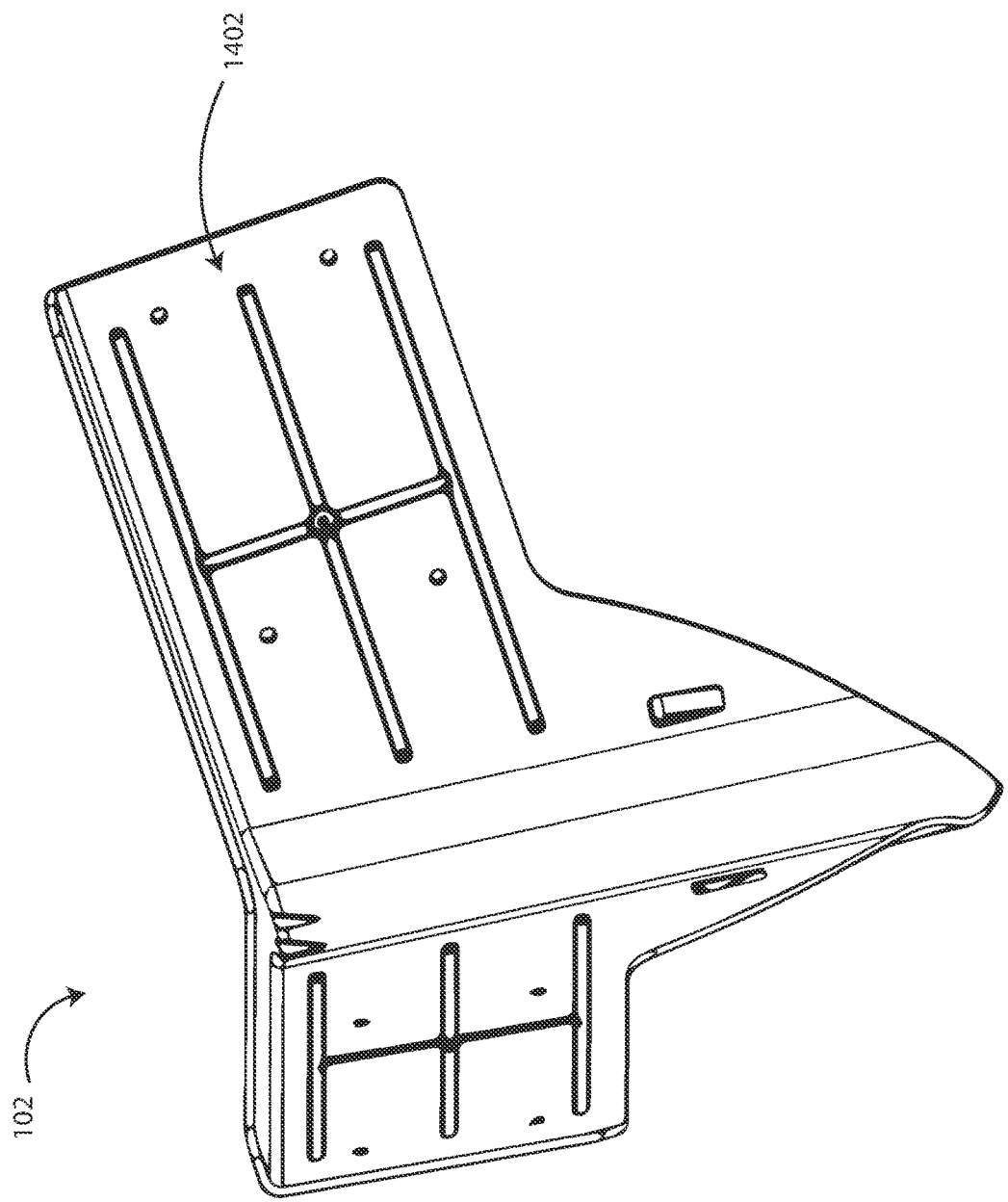
FIG. 38 is a schematic rear view of the alternative corner protector shown in FIG. 37.

The corner protector 102 of FIG. 35 can further include one or more glue channels 1402. Referring now to FIG. 37, a front view corner protector 102 is shown in accordance with various embodiments herein. The corner protector 102 can be positioned on the plates 210. In some embodiments, the glue channels 1402 can include a glue injection hole 1404, discussed on detail above. Referring now to FIG. 38, a rear view of the corner protector 102 shown in FIG. 37 is shown in accordance with various embodiments herein. As shown, the glue channels 1402 can protrude outward from the plates 210.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application were specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

What is claimed is:

1. A corner cover for protecting a ground-interface surface, the corner cover comprising:
   a first plate;
   a second plate, wherein the second plate is positioned substantially perpendicular to the first plate;
   a central protrusion, wherein the central protrusion is positioned at a joint between the first plate and the second plate, further wherein the central protrusion having a first end and a second end;
   a pointed blade, wherein the pointed blade is formed at the first end of the joint between the first plate and the second plate; and
   a lip, wherein the lip is positioned at the second end of the central protrusion; and
   further comprising one or more anti-heave portions.

2. The corner cover of claim 1, wherein the first plate and the second plate each have a secondary hollow protrusion positioned distal the central protrusion.

3. The corner cover of claim 1, wherein the first plate and the second plate have one or more holes for fasteners.

4. The corner cover of claim 1, wherein the first plate and the second plate comprise a curved edge, wherein the curved edge merges with the pointed blade.

5. The corner cover of claim 1, wherein the first end of the central protrusion merges with the pointed blade.

6. The corner cover of claim 1, wherein the central protrusion has a hemiconical shape.

7. The corner cover of claim 1, wherein the second end of the central protrusion is adjacent the lip.

8. The corner cover of claim 1, wherein the second end of the central protrusion comprises a substantially flat surface.

9. The corner cover of claim 1, wherein the central protrusion comprises a hollow interior portion.

10. The corner cover of claim 9, wherein the hollow interior portion comprises one or more reinforcement portions positioned at the second end of the central protrusion.

11. The corner cover of claim 1, wherein the lip extends over an edge of an electrical box pad.

12. The corner cover of claim 1, wherein the lip abuts an edge of an electrical box pad.

13. The corner cover of claim 1, wherein the one or more anti-heave portions are positioned on the pointed blade.

14. The corner cover of claim 1, wherein the one or more anti-heave portions protrude outward from the pointed blade.

15. The corner cover of claim 1, wherein the one or more anti-heave portions are hollow.

16. The corner cover of claim 1, wherein the one or more anti-heave portions comprise a polygonal structure that extends from the pointed blade at an angle.

17. The corner cover of claim 1, further comprising one or more glue channels.

18. The corner cover of claim 17, wherein the one or more glue channels are positioned on the first plate and the second plate.

19. A corner cover for protecting a ground-interface surface, the corner cover comprising:
   a first plate;
   a second plate, wherein the second plate is positioned substantially perpendicular to the first plate;
   a central protrusion, wherein the central protrusion is positioned at a joint between the first plate and the second plate, further wherein the central protrusion having a first end and a second end;
   a pointed blade, wherein the pointed blade is formed at the first end of the joint between the first plate and the second plate;
   a lip, wherein the lip is positioned at the second end of the central protrusion; and
   further comprising one or more glue channels.

20. The corner cover of claim 19, wherein the one or more glue channels are positioned on the first plate and the second plate.

* * * * *